(12) United States Patent
Hackworth et al.

(10) Patent No.: US 7,048,052 B2
(45) Date of Patent: *May 23, 2006

(54) APPARATUS COMPRISING EXPANDABLE BISTABLE TUBULARS AND METHODS FOR THEIR USE IN WELLBORES

(75) Inventors: Matthew R. Hackworth, Pearland, TX (US); Craig D. Johnson, Montgomery, TX (US); Patrick W. Bixenman, Bartlesville, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/697,783

(22) Filed: Oct. 30, 2003

(65) Prior Publication Data

US 2004/0089454 A1    May 13, 2004

Related U.S. Application Data

(62) Division of application No. 10/035,994, filed on Dec. 26, 2001, now Pat. No. 6,648,071.

(60) Provisional application No. 60/263,934, filed on Jan. 24, 2001.

(51) Int. Cl.
*E21B 43/08* (2006.01)
*E21B 43/10* (2006.01)
*E21B 17/46* (2006.01)
*F16B 5/07* (2006.01)

(52) U.S. Cl. ............ 166/277; 166/207; 166/242.6; 166/384; 411/33; 285/330; 285/333; 403/309; 403/367

(58) Field of Classification Search .............. 166/277, 166/278, 297, 381, 384, 55, 227, 228, 230, 166/207, 242.1, 242.2, 242.6; 411/32, 33; 285/330, 913, 382, 333, 334; 403/309, 365, 403/366, 367
See application file for complete search history.

(56) References Cited

U.S. PATENT DOCUMENTS

| 4,495,997 A | * | 1/1985 | Scott et al. ............ 166/285 |
| 4,626,129 A | | 12/1986 | Kothmann et al. |
| 5,348,095 A | | 9/1994 | Worrall et al. |
| 5,366,012 A | | 11/1994 | Lohbeck |

(Continued)

FOREIGN PATENT DOCUMENTS

GB    2 370 574 A    7/2002

(Continued)

OTHER PUBLICATIONS

Besselink, Peter; Biflex Stents; SMST-99: Proceedings of the First European Conference on Shape Memory and Superelastic Technologies, Antwerp Zoo, Belgium, 1999; pp. 142-150.

(Continued)

*Primary Examiner*—Jennifer H. Gay
(74) *Attorney, Agent, or Firm*—Van Someren, P.C.; Kevin P. McEndney; Jaime A. Castano

(57) ABSTRACT

At least a first expandable tubular and a second expandable tubular are connected to each other by a connector system. The connector system is expandable and utilizes a plurality of extensions that may be used to create an interlocking engagement. The system design enables both the tubulars and the connector system to be expanded to an increased diameter.

20 Claims, 27 Drawing Sheets

U.S. PATENT DOCUMENTS

| | | | |
|---|---|---|---|
| 5,924,745 A | 7/1999 | Campbell | |
| 5,984,568 A | 11/1999 | Lohbeck | |
| 6,029,748 A | 2/2000 | Forsyth et al. | |
| 6,070,671 A | 6/2000 | Cumming et al. | |
| 6,135,208 A | 10/2000 | Gano et al. | |
| 6,273,634 B1 | 8/2001 | Lohbeck | |
| 6,488,702 B1 | 12/2002 | Besselink | |
| 6,575,245 B1* | 6/2003 | Hurst et al. | 166/278 |
| 6,648,071 B1* | 11/2003 | Hackworth et al. | 166/207 |
| 6,695,054 B1* | 2/2004 | Johnson et al. | 166/278 |
| 2002/0046840 A1* | 4/2002 | Schetky et al. | 166/277 |
| 2003/0079885 A1* | 5/2003 | Schetky et al. | 166/380 |
| 2003/0079886 A1* | 5/2003 | Schetky et al. | 166/382 |
| 2004/0104026 A1* | 6/2004 | Johnson et al. | 166/207 |
| 2004/0177959 A1* | 9/2004 | Schetky et al. | 166/277 |
| 2004/0193247 A1* | 9/2004 | Besselink | 623/1.15 |

FOREIGN PATENT DOCUMENTS

| | | |
|---|---|---|
| WO | WO 98/32412 | 7/1998 |
| WO | WO 99/23354 | 5/1999 |
| WO | WO 2004/014255 | 2/2004 |

OTHER PUBLICATIONS

Docket Sheet for *Memry Corporation* v. *Kentucky Oil Technology, N.V.*, Case No. H-04-1959 (S.D. Tex.) (PACER Jun. 2, 2005) (5 pages).

Docket Sheet for *Memry Corporation* v. *Kentucky Oil Technology, N.V.*, Case No. C-04-03843, (N.D. Cal.) (PACER Aug. 11, 2005) (13 pages).

Communication from United States District Court Transferring Case, *Memry Corporation* v. *Kentucky Oil Technology, N.V.*, Case No. H-04-1959 (S.D. Tex.), date Sep. 7, 2004 (1 page).

Plaintiffs' Original Complaint, *Memry Corporation* v. *Kentucky Oil Technology, N.V.*, Case No. H-04-1959, (S.D. Tex.), filed May 14, 2004 (20 pages).

Defendants' Motions (1) to Dismiss the Complaint for Insufficiency of Process and Lack of Personal Jurisdiction, (2) to Dismiss Counts I-III of the Complaint for Failure to State a Claim, and (3) in the Alternative to Transfer This Action to the Federal District Court for the Northern District of California, *Memry Corporation* v. *Kentucky Oil Technology, N.V.*, Case No. H-04-1959, (S.D. Tex.), filed Jul. 7, 2004 (49 pages).

Plaintiff's First Amended Complaint, *Memry Corporation* v. *Kentucky Oil Technology, N.V.* Case No. C-04-03843, (N.D. Cal.), filed Aug. 19, 2004 (20 pages).

Answer of Defendants and Counterclaims of Kentucky Oil Technology N.V. Against Memry Corporation and Schlumberger Technology Corporation, *Memry Corporation* v. *Kentucky Oil Technology, N.V.*, Case No. C-04-03843, (N.D. Cal.) filed Nov. 2, 2004 (20 pages).

Plaintiff and Counterdefendant Memry Corporation's Answer to Kentucky Oil Technology N.V.'s Counterclaims and Demand for Jury Trial, *Memry Corporation* v. *Kentucky Oil Technology, N.V.*, Case No. C-04-03843, (N.D. Cal.), filed Dec. 3, 2004 (10 pages).

Schlumberger Technology Corporation's Notice of Motion and Motion to Dismiss Kentucky Oil Technology's Third, Fourth, Fifth, and Sixth Counterclaims; and Memorandum of Points and Authorities, *Memry Corporation* v. *Kentucky Oil Technology, N.V.*, Case No. C-04-03843, (N.D. Cal.), filed Jan. 24, 2005 (32 pages).

[Proposed] Order Granting Schlumberger Technology Corporation's Motion to Dismiss Kentucky Oil Technology's Third, Fourth, Fifth, and Sixth Counterclaims, *Memry Corporation* v. *Kentucky Oil Technology, N.V.*, Case No. C-04-03843, (N.D. Cal.), filed Jan. 24, 2005 (3 pages).

First Amended Counterclaims of Kentucky Oil Technology N.V. Against Memry Corporation and Schlumberger Technology Corporation, *Memry Corporation* v. *Kentucky Oil Technology, N.V.*, Case No. C-04-03843, (N.D. Cal.), filed Feb. 9, 2005 (16 pages).

Schlumberger Technology Corporation's Notice of Motion and Motion to Dismiss Kentucky Oil Technology's First Amended Third, Fourth, Fifth, and Sixth Counterclaims; and Memorandum of Points and Authorities, *Memry Corporation* v. *Kentucky Oil Technology, N.V.*, Case No. C-04-03843, (N.D. Cal.), filed Feb. 24, 2005 (32 pages).

Request for Judicial Notice in Support of Schlumberger Technology Corporation's Motion to Dismiss Kentucky Oil Technology's First Amended Third, Fourth, Fifth, and Sixth Counterclaims, *Memry Corporation* v. *Kentucky Oil Technology, N.V.*, Case No. C-04-03843, (N.D. Cal.), filed Feb. 24, 2005 (3 pages).

[Proposed] Order Granting Schlumberger Technology Corporation's Motion to Dismiss Kentucky Oil Technology's First Amended Third, Fourth, Fifth, and Sixth Counterclaims, *Memry Corporation* v. *Kentucky Oil Technology, N.V.*, Case No. C-04-03843, (N.D. Cal.), filed Feb. 24, 2005 (3 pages).

Plaintiff and Counterdefendant Memry Corporation's Notice of Motion and Motion to Dismiss Kentucky Oil Technology's Third, Fourth, Fifth, and Sixth Counterclaims; and Memorandum of Points and Authorities, *Memry Corporation* v. *Kentucky Oil Technology, N.V.*, Case No. 04-03843, (N.D. Cal.), filed Feb. 25, 2005 (29 pages).

Request for Judicial Notice in Support of Memry Corporation's Motion to Dismiss Kentucky Oil Technology's Third, Fourth, Fifth, and Sixth Counterclaims, *Memry Corporation* v. *Kentucky Oil Technology, N.V.*, Case No. C-04-03843, (N.D. Cal.), filed Feb. 25, 2005 (3 pages).

[Proposed] Order Granting Memry Corporation's Motion to Dismiss Kentucky Oil Technology's Third Fourth, Fifth, and Sixth Counterclaims, *Memry Corporation* v. *Kentucky Oil Technology, N.V.*, Case No. C-04-03843, (N.D. Cal.), filed Feb. 25, 2005 (3 pages).

Opposition of Kentucky Oil to Motions of Memry Corporation and Schlumberger Technology Corporation to Dismiss First Amended Counterclaims, *Memry Corporation* v. *Kentucky Oil Technology, N.V.*, Case No. C-04-03843, (N.D. Cal.), filed Mar. 11, 2005 (29 pages).

Kentucky Oil's Opposition to Counterdefendants' Requests for Judicial Notice in Support of Their Motions to Dismiss Kentucky Oil Technology's First Amended Third, Fourth, Fifth, and Sixth Counterclaims, *Memry Corporation* v. *Kentucky Oil Technology, N.V.*, Case No. C-04-03843, (N.D. Cal.), filed Mar. 11, 2005 (3 pages).

Plaintiff and Counterdefendant Memry Corporation's Reply in Support of Motion to Dismiss Kentucky Oil Technology's Third, Fourth, Fifth, Sixth Counterclaims, *Memry Corporation* v. *Kentucky Oil Technology, N.V.*, Case No. C-04-03843, (N.D. Cal.), filed Mar. 18, 2005 (9 pages).

Plaintiff and Counterdefendant Memry Corporation's Reply in Support of Request for Judicial Notice, *Memry Corporation* v. *Kentucky Oil Technology, N.V.*, Case No. C-04-03843, (N.D. Cal.), filed Mar. 18, 2005 (4 pages).

Reply of Schlumberger Technology Corporation to Kentucky Oil Technology's Opposition to First Amended, Third, Fourth, Fifth and Sixth Counterclaims, *Memry Corporation v. Kentucky Oil Technology, N.V.,* Case No. C-04-03843, (N.D. Cal.), filed Mar. 18, 2005 (17 pages).
Schlumberger's Response to Kentucky Oil's Opposition to Counterdefendants' Requests for Judicial Notice, *Memry Corporation v. Kentucky Oil Technology, N.V.,* Case No. C-04-03843, (N.D. Cal.), filed Mar. 18, 2005 (3 pages).
Schlumberger's Notice of Motion and Motion to Strike Exhibits 1, 2, and 4 to the Declaration of Nicola A. Pisano, *Memry Corporation v. Kentucky Oil Technology, N.V.,* Case No. C-04-03843, (N.D. Cal.), filed Mar. 18, 2005 (3 pages).
Kentucky Oil's Opposition to STC's Motion to Strike Exhibits 1, 3 and 4 to the Declaration of Nicola A. Pisano, *Memry Corporation v. Kentucky Oil Technology, N.V.,* Case No. C-04-03843, (N.D. Cal.), filed Mar. 25, 2005 (3 pages).
Kentucky Oil's Notice of Motion and Motion to Strike Declaration of Benjamin Holl and Portions of Counterdefendants' Reply Briefs, *Memry Corporation v. Kentucky Oil Technology, N.V.,* Case No. C-04-03843, (N.D. Cal.), filed Mar. 25, 2005 (4 pages).
[Proposed] Order Granting Kentucky Oil's Motion to Strike Declaration of Benjamin Holl and Portions of Counterdefendants' Reply Briefs, *Memry Corporation v. Kentucky Oil Technology, N.V.,* Case No. C-04-03843, (N.D. Cal.), entered Mar. 25, 2005 (2 pages).
Order Granting in Part and Denying in Part Counterdefendants' Motion to Dismiss, *Memry Corporation v. Kentucky Oil Technology, N.V.,* Case No. C-04-03843, (N.D. Cal.), entered Apr. 8, 2005 (26 pages).
Plaintiff and Counterdefendant Memry Corporation's Reply to Kentucky Oil Technology N.V.'s Counterclaims and Demand for Jury Trial, *Memry Corporation v. Kentucky Oil Technology, N.V.,* Case No. C-04-03843, (N.D. Cal.), filed Apr. 18, 2005 (8 pages).
Second Amended Counterclaims of Kentucky Oil Technology N.V. Against Memry Corporation and Schlumberger Technology Corporation, *Memry Corporation v. Kentucky Oil Technology, N.V.,* Case No. C-04-03843, (N.D. Cal.), filed May 6, 2005 (20 pages).
Plaintiff Memry Corporation's Reply to Kentucky Oil Technolgy N.V.'s Second Amended Counterclaims and Demand for Jury Trial, *Memry Corporation v. Kentucky Oil Technology, N.V.,* Case No. C-04-03843, (N.D. Cal.), filed Jun. 3, 2005 (9 pages)
Schlumberger Technology Corporation's Notice of Motion and Motion to Dismiss the Fourth, Fifth, Sixth, Seventh and Eighth Counterclaims in Kentucky Oil Technology's Second Amended Counterclaims, *Memry Corporation v. Kentucky Oil Technology, N.V.,* Case No. C-04-03843, (N.D. Cal.), filed Jun. 3, 2005 (18 pages).
Opposition of Kentucky Oil Technology to Schlumberger Terchnology Corporation's Motion to Dismiss Kentucky Oil's Second Amended Counterclaims, *Memry Corporation v. Kentucky Oil Technology, N.V.,* Case No. C-04-03843, (N.D. Cal.), filed Jun. 17, 2005 (16 pages).
Schlumberger Technology Corporation's Reply Brief in Support of its Motion to Dismiss the Fourth, Fifth, Sixth, Seventh and Eighth Counterclaims in Kentucky Oil Technology's Second Amended Counterclaims, *Memry Corporation v. Kentucky Oil Technology, N.V.,* Case No. C-04-03843, (N.D. Cal.), filed Jun. 24, 2005 (11 pages).
Order Granting in Part and Denying in Part STC's Motion to Dismiss, *Memry Corporation v. Kentucky Oil Technology, N.V.,* Case No. C-04-03843, (N.D. Cal.), entered Jul. 14, 2005 (8 pages).
Schlumberger Technology Corporation's Answer to Kentucky Oil Technology's Second Amended Counterclaims, *Memry Corporation v. Kentucky Oil Technology, N.V.,* Case No. C-04-03843, (N.D. Cal.), filed Jul., 28, 2005 (8 pages).
Notice o Motion and Motion by Kentucky Oil to Compel Production of Documents by Schlumberger Technology Corporation Pursuant to Fed. R. Civ. Rule 37; Memorandum of Points and Authorities in Support Thereof; Declaration of Michael Bierman, *Memry Corporation v. Kentucky Oil Technology, N.V.,* Case No. C-04-03843, (N.D. Cal.), filed Jul. 28, 1005 (32 pages).
Schlumberger Technology Corporation's Opposition to Kentucky Oil Technology's Motion to Compel, *Memry Corporation v. Kentucky Oil Technology, N.V.,* Case No. C-04-03843, (N.D. Cal.), filed Aug. 4, 2005 (21 pages).
Declaration of David B. Moyer in Support of Schlumberger Technology Corporation's Opposition to Kentucky Oil Technology's Motion to Compel, *Memry Corporation v. Kentucky Oil Technology, N.V.,* Case No. C-04-03843, (N.D. Cal.), filed Aug. 4, 2005 (52 pages).
Kentucky Oil's Reply in Support of Motion to Compel, *Memry Corporation v. Kentucky Oil Technology, N.V.,* Case No. C-04-03843, (N.D. Cal.), filed Aug. 10, 2005 (18 pages).
Declaration of Nicola A. Pisano in Support of Kentucky Oil's Motion to Compel, *Memry Corporation v. Kentucky Oil Technology, N.V.,* Case No. C-04-03843, (N.D. Cal.), filed Aug. 10, 2005 (69 pages).
Order Granting Kentucky Oil's Motion to Compel Production of Documents, *Memry Corporation v. Kentucky Oil Technology, N.V.,* Case No. C-04-03843, (N.D. Cal.), entered Aug. 17, 2005 (8 pages).
US 6,706,063, 03/2004, Besselink (withdrawn)

* cited by examiner

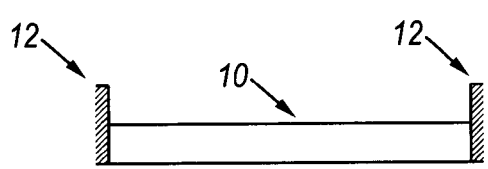
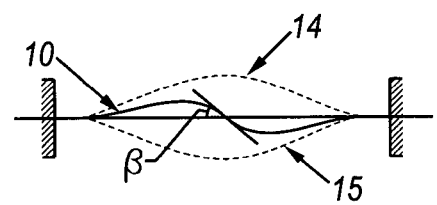
FIG. 1A  FIG. 1B
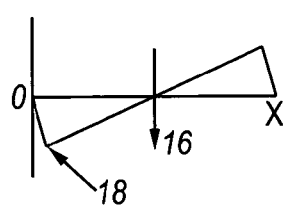
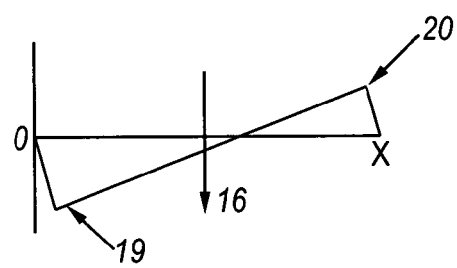
FIG. 2A  FIG. 2B
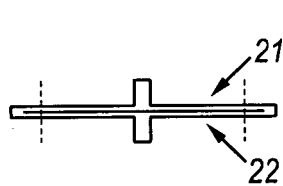
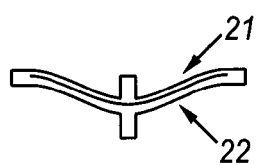
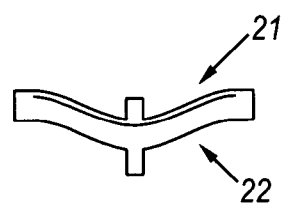
FIG. 3A  FIG. 3C  FIG. 3E
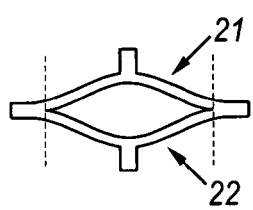
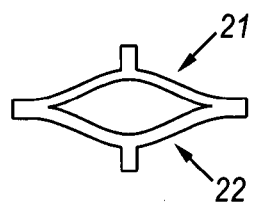
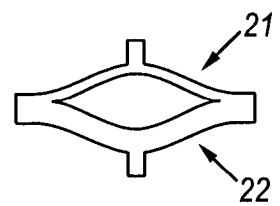
FIG. 3B  FIG. 3D  FIG. 3F

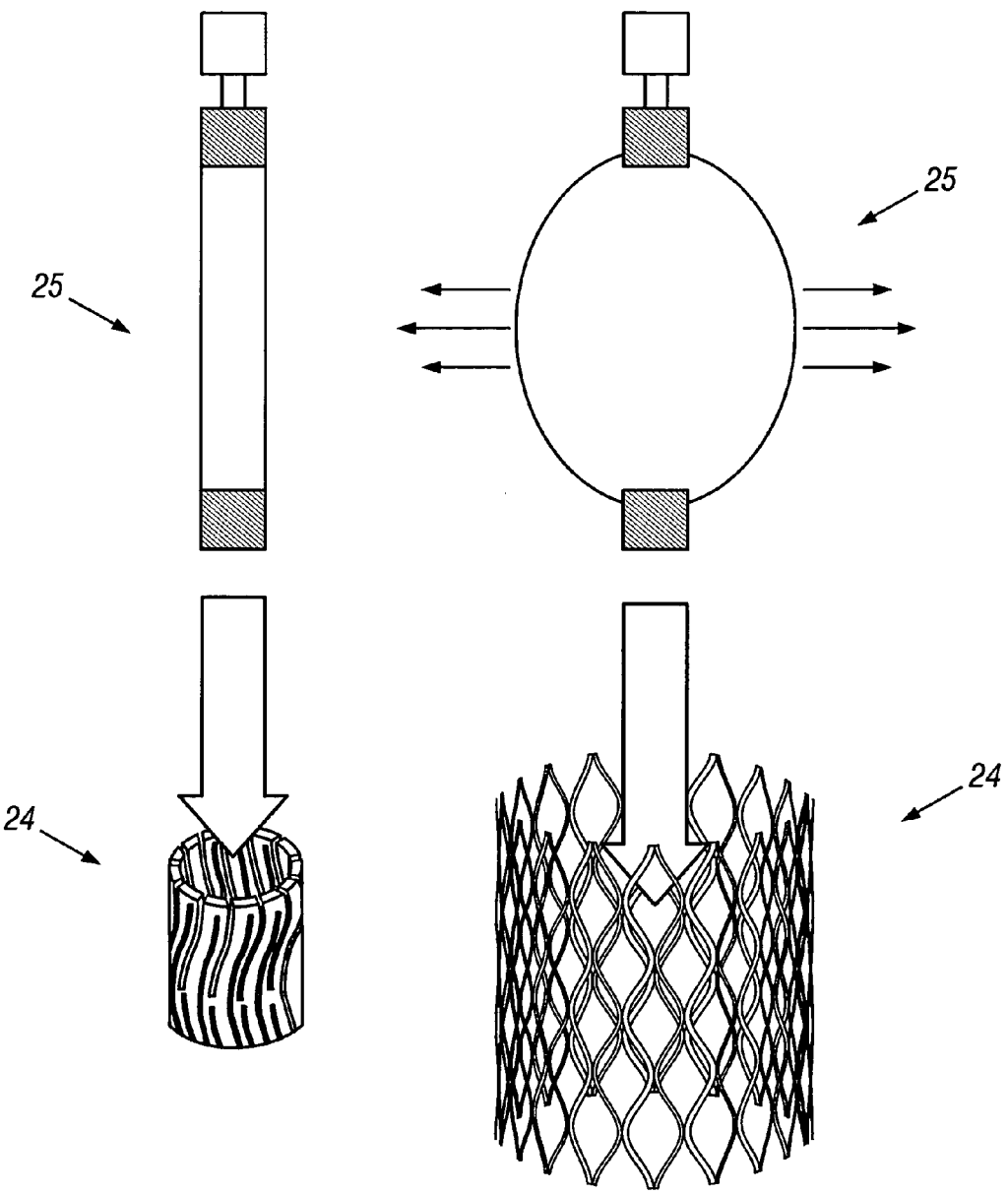
*FIG. 5A*  *FIG. 5B*

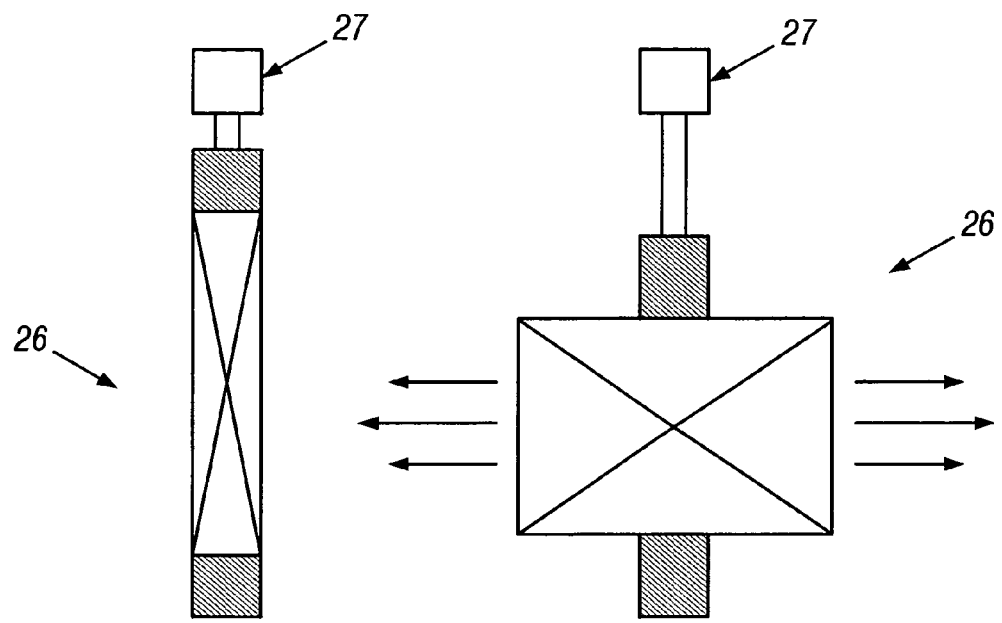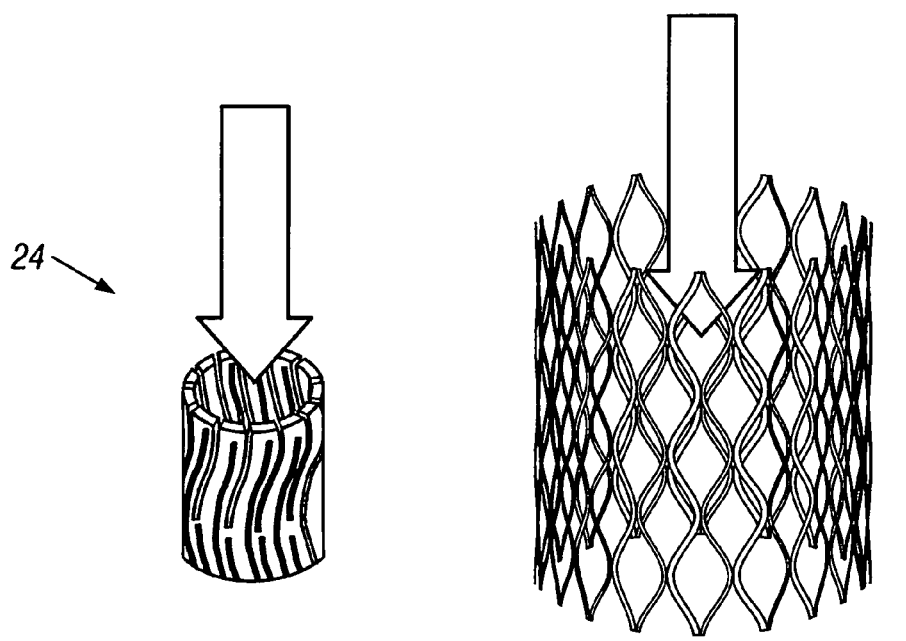
*FIG. 6A*  *FIG. 6B*

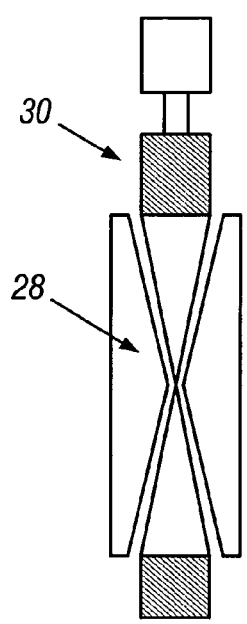
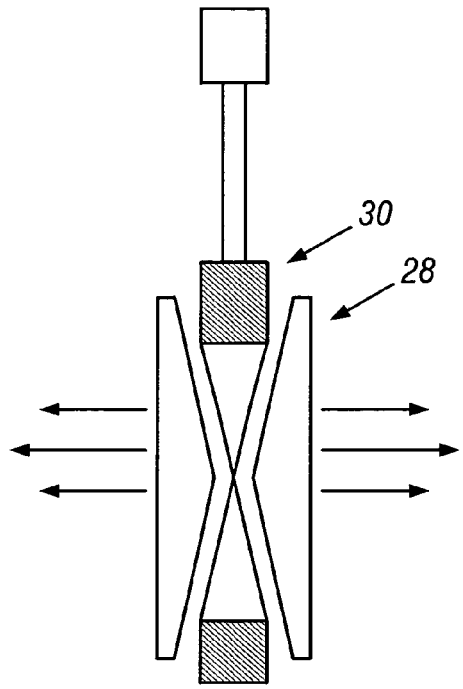
FIG. 7A    FIG. 7B
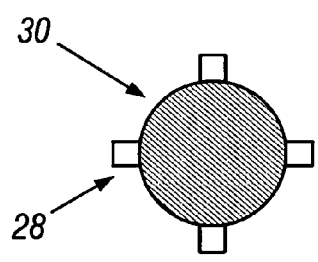
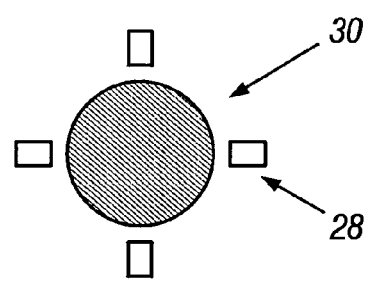
FIG. 7C    FIG. 7D

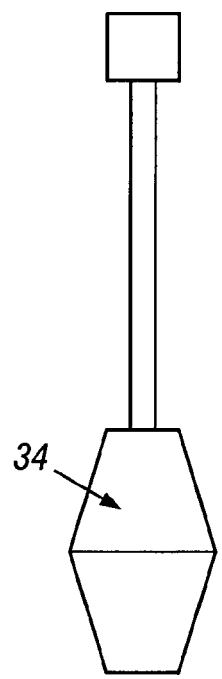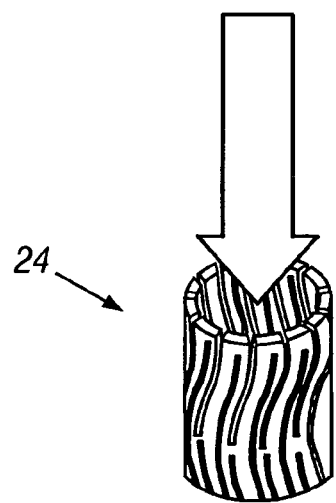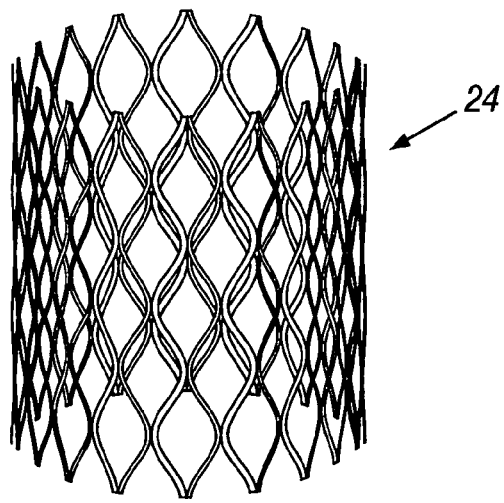
FIG. 9A						FIG. 9B

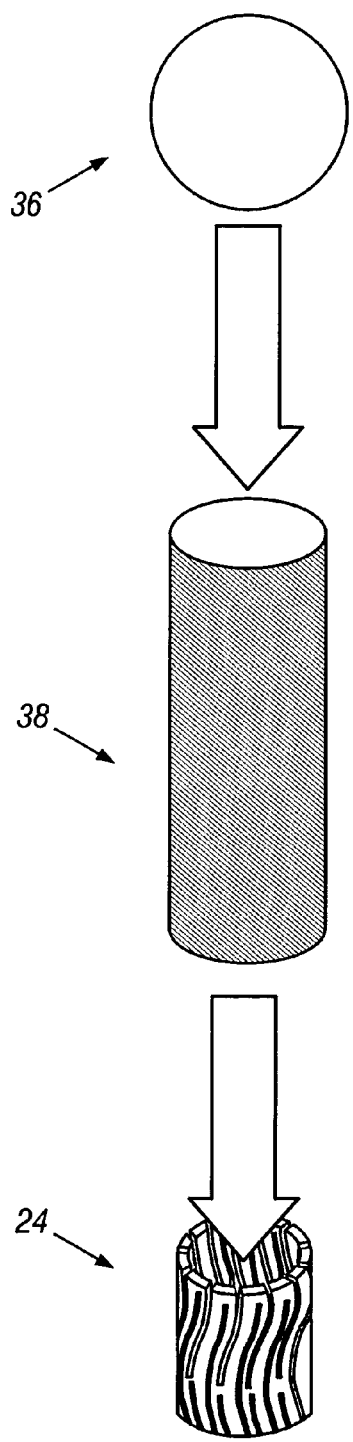
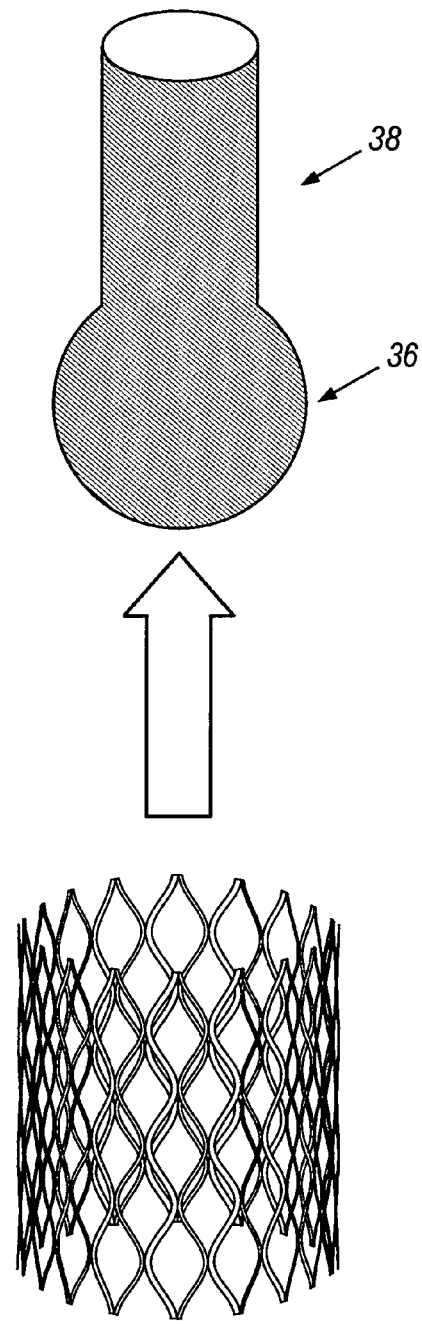
*FIG. 10A*  *FIG. 10B*

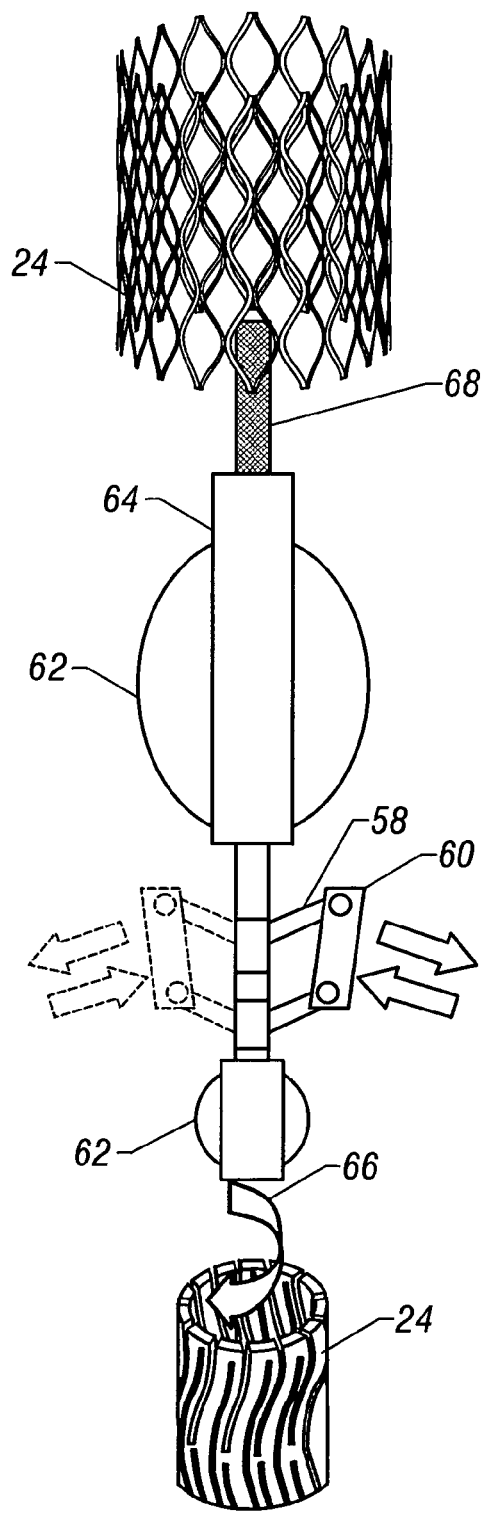
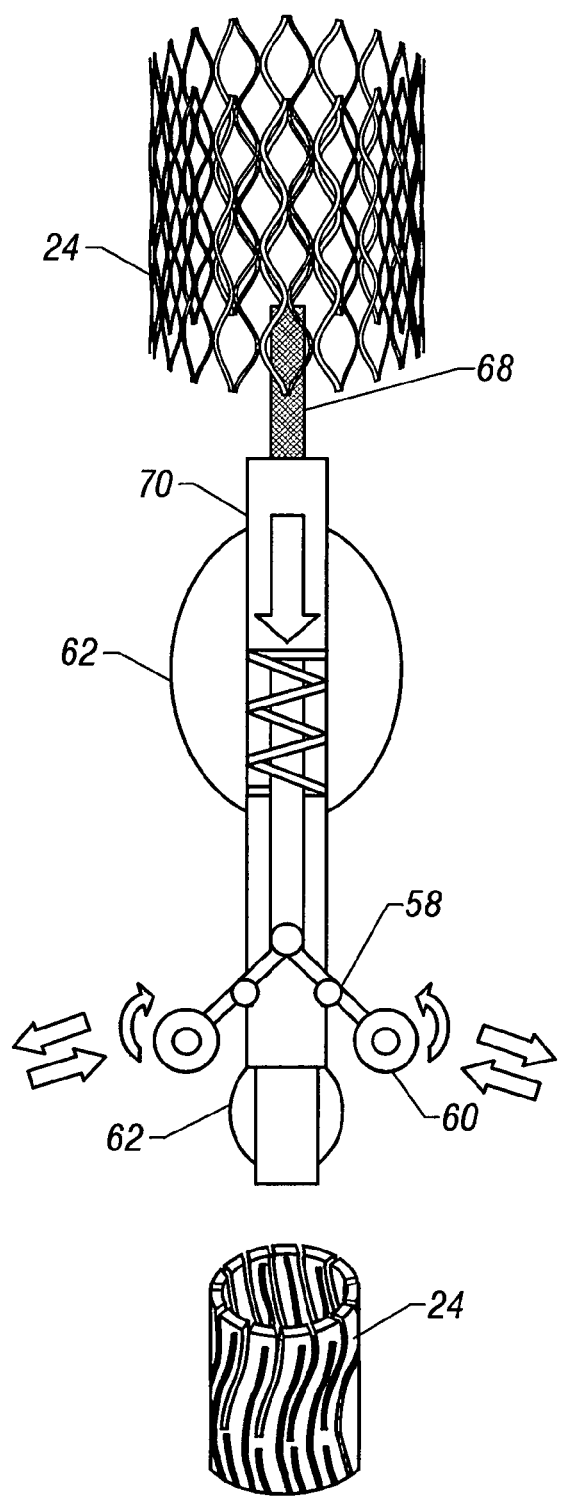
FIG. 12  FIG. 13

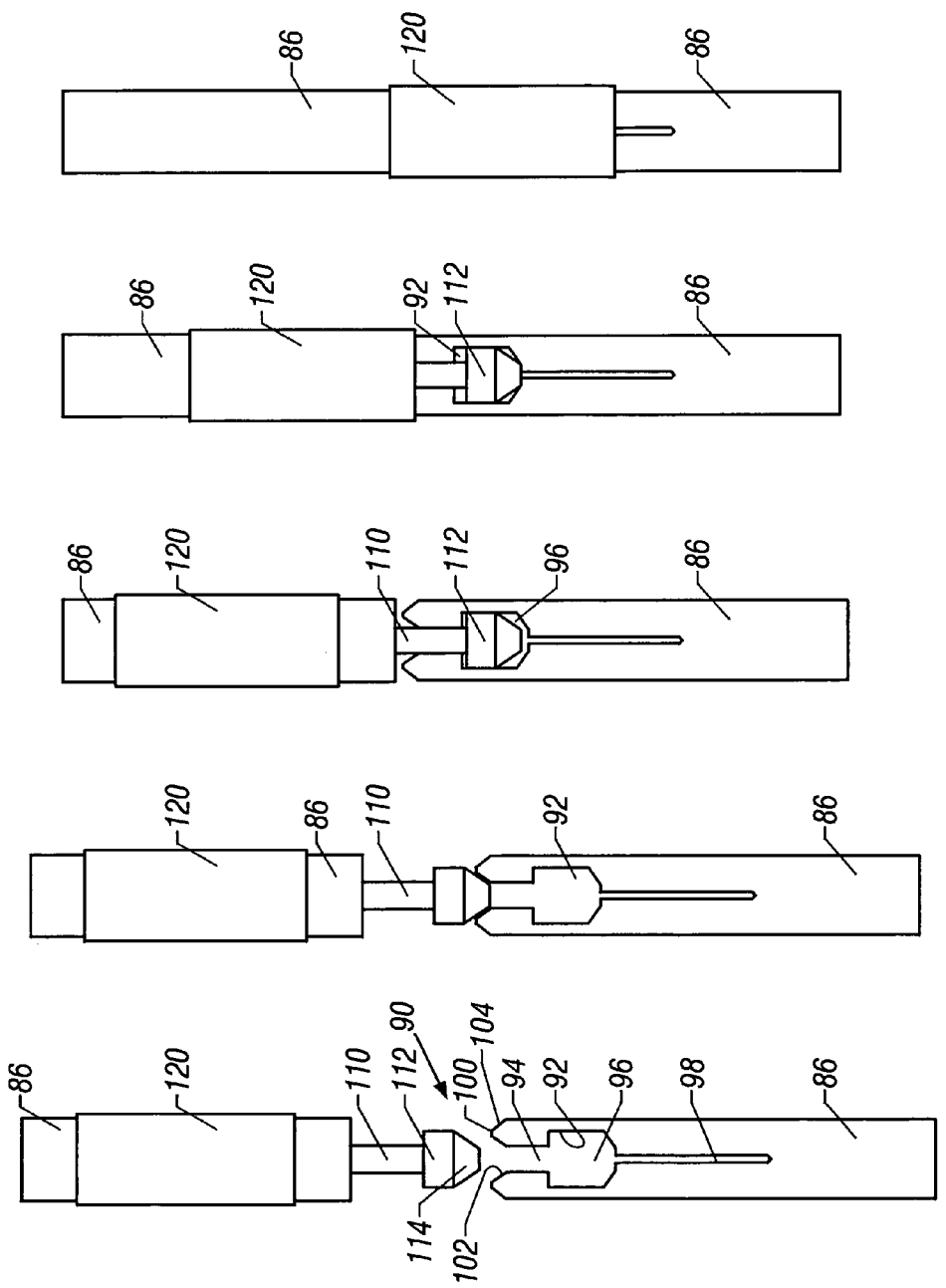

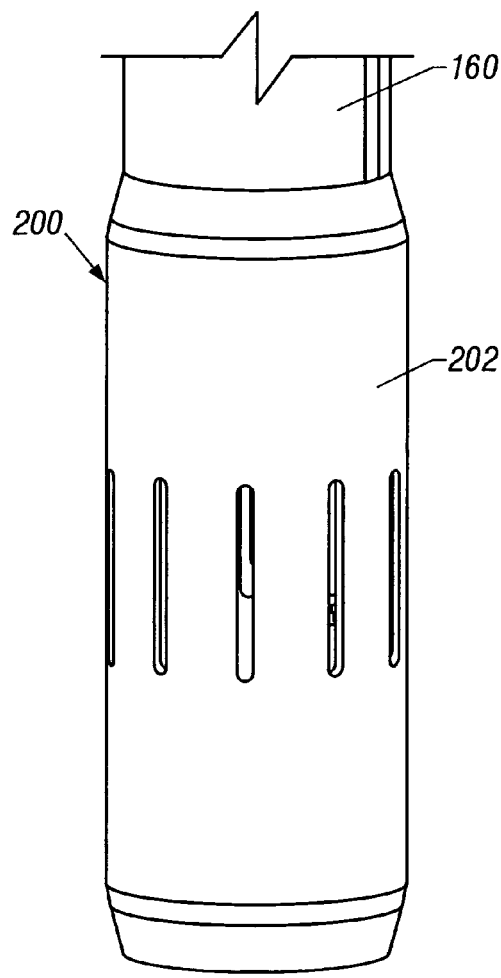
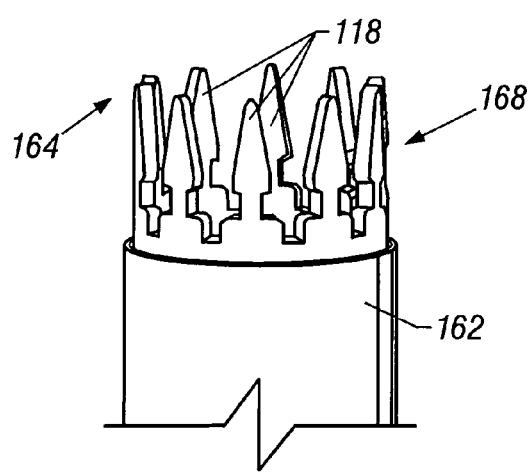
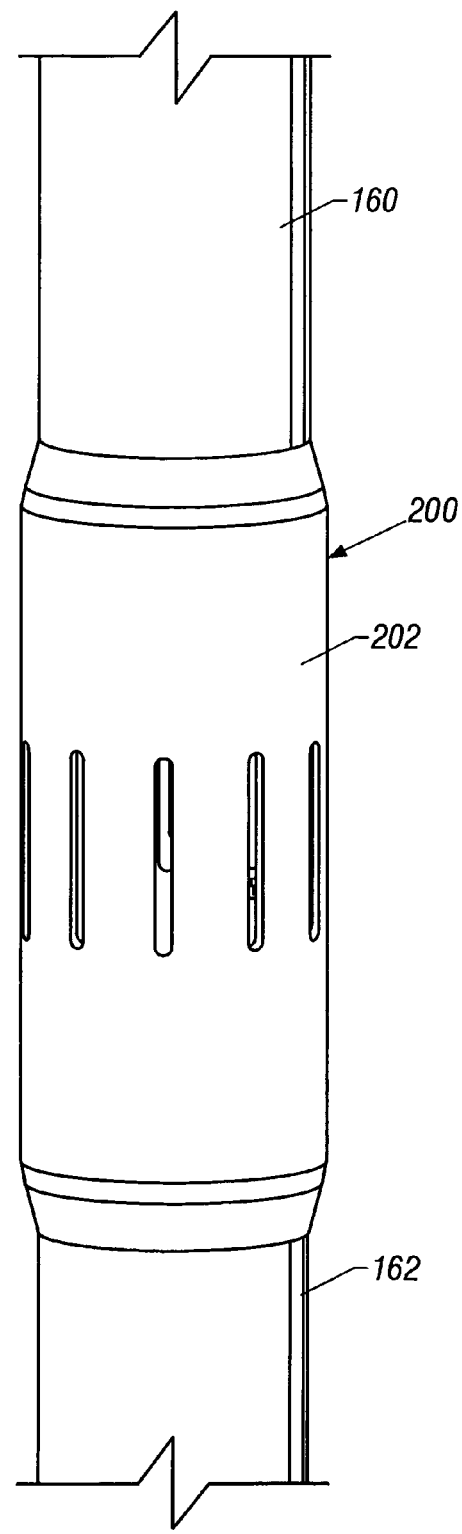
*FIG. 23A*  *FIG. 23B*

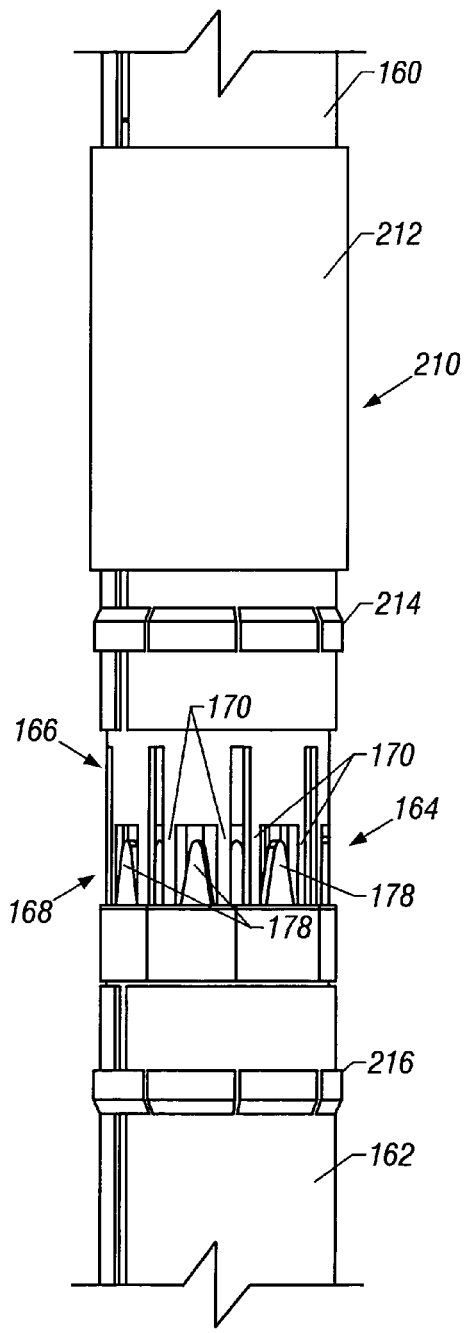 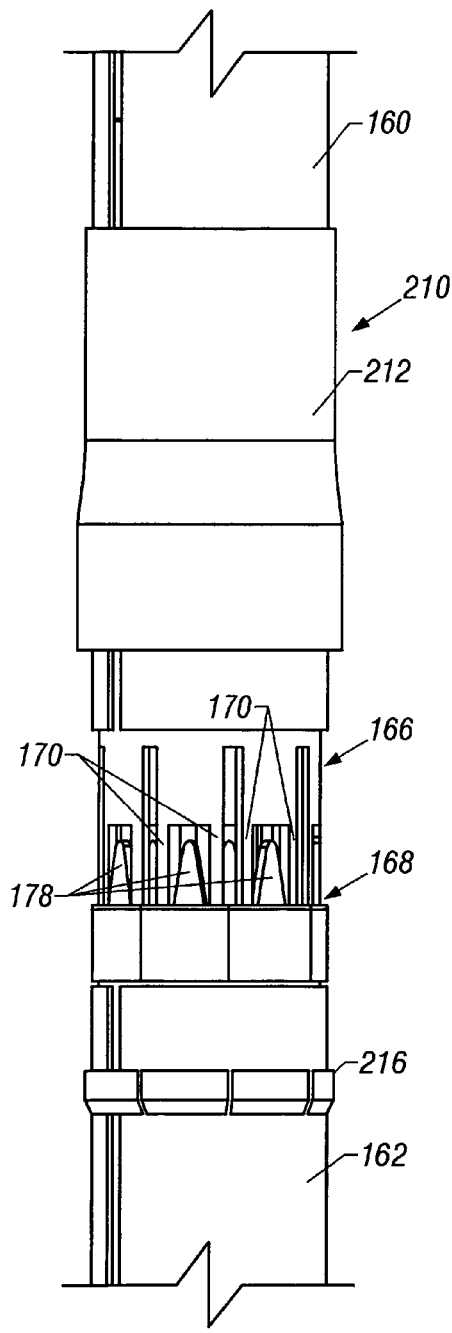
FIG. 24A  FIG. 24B

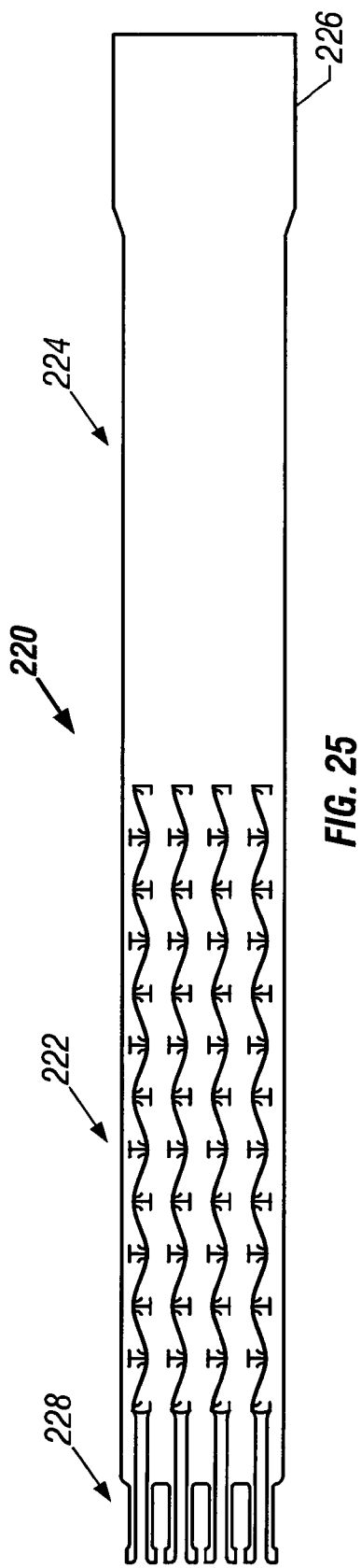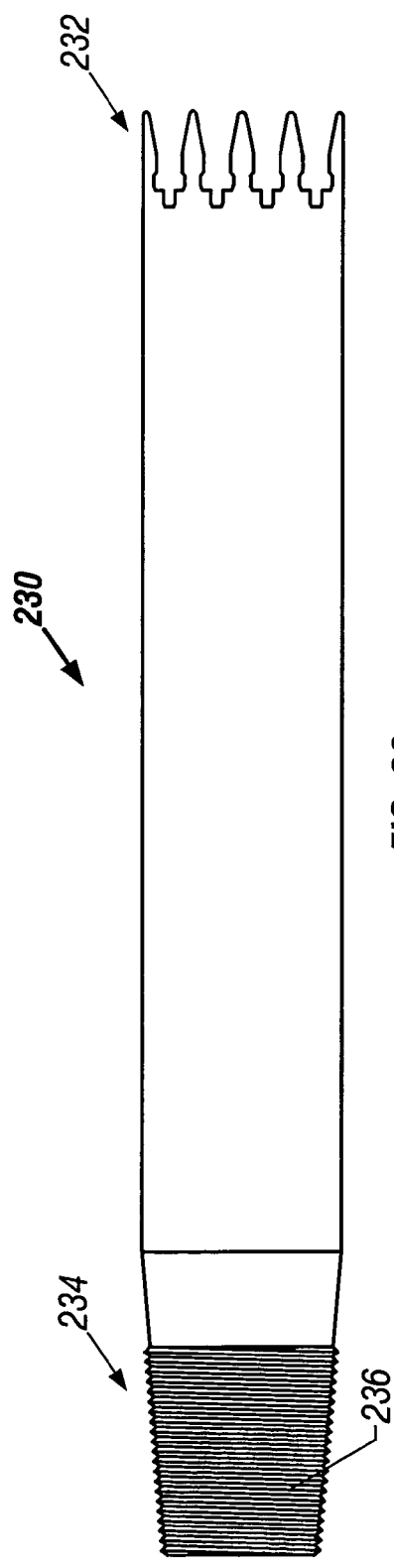
FIG. 25
FIG. 26

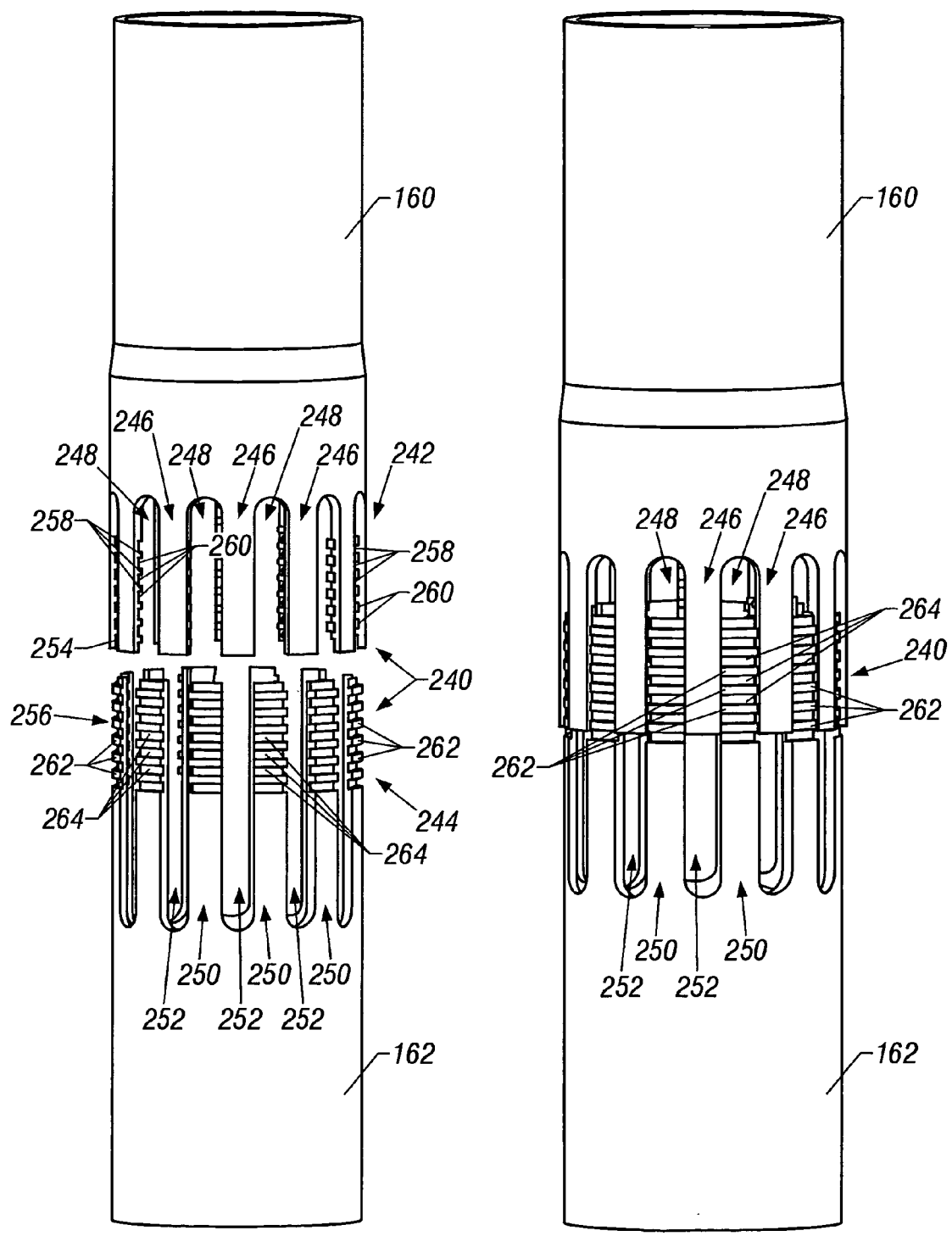
*FIG. 27A*  *FIG. 27B*

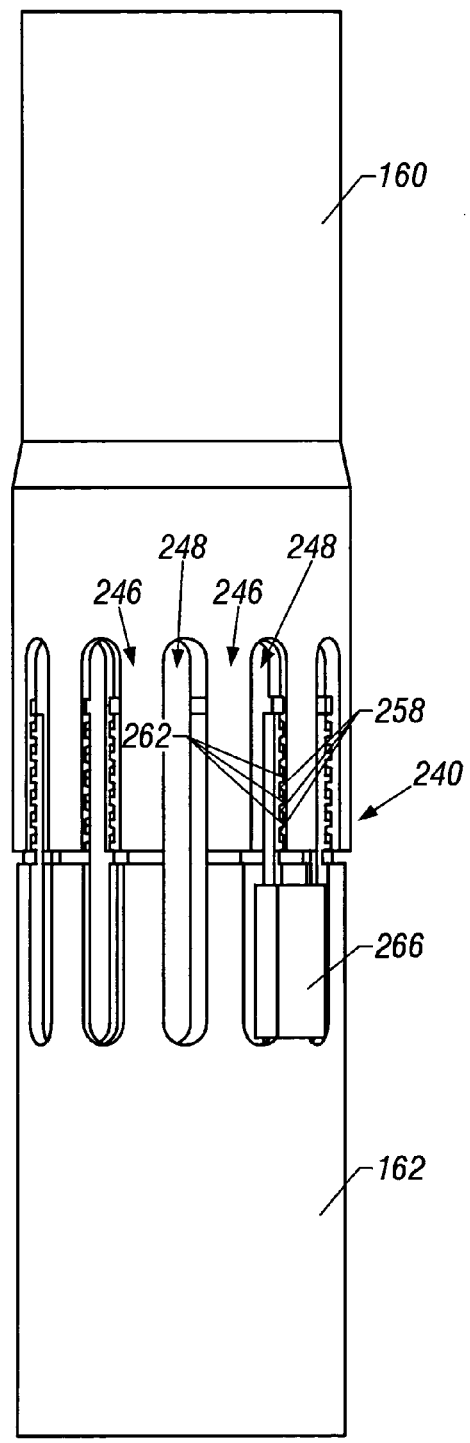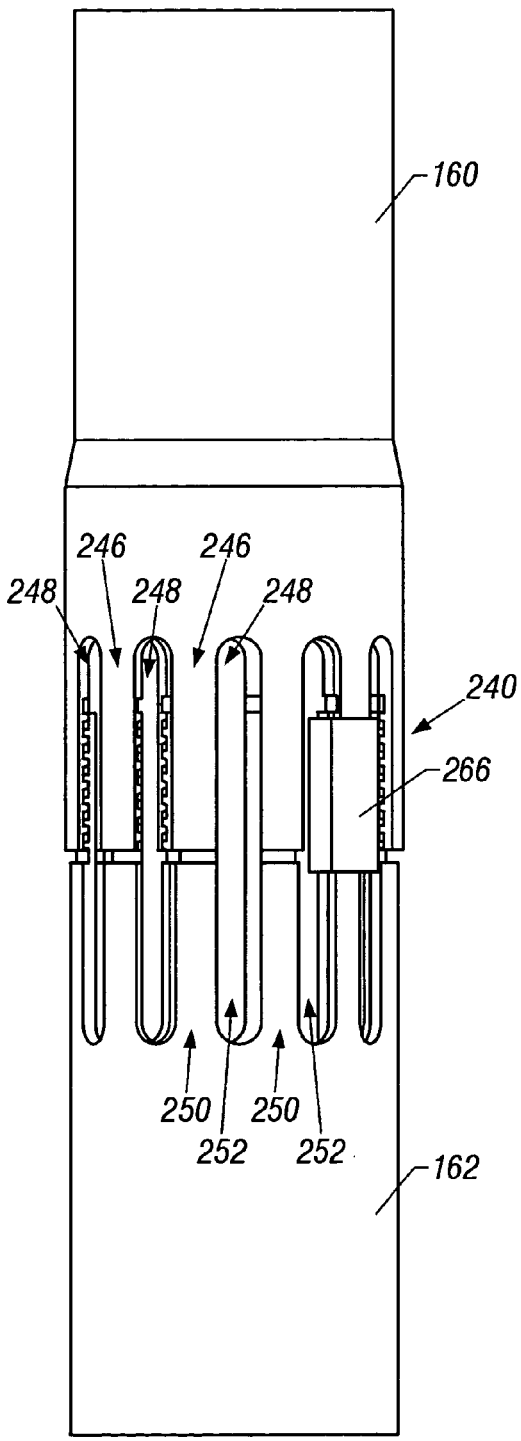
*FIG. 27C*  *FIG. 27D*

APPARATUS COMPRISING EXPANDABLE BISTABLE TUBULARS AND METHODS FOR THEIR USE IN WELLBORES

CROSS REFERENCE TO RELATED APPLICATIONS

This is a divisional of application Ser. No. 10/035,994, filed Dec. 26, 2001, now U.S. Pat. No.: 6,648,071, issued Nov. 18, 2003, which claims the benefit under 35 USC 119(e) to U.S. Provisional Application Ser. No.: 60/263,934, filed Jan. 24, 2001.

FIELD OF THE INVENTION

This invention relates to equipment that can be used in the drilling and completion of wellbores in an underground formation and in the production of fluids from such wells, and particularly to connection systems for connecting a variety of tubulars used in wellbores.

BACKGROUND OF THE INVENTION

Fluids such as oil, natural gas and water are obtained from a subterranean geologic formation (a "reservoir") by drilling a well that penetrates the fluid-bearing formation. Once the well has been drilled to a certain depth the borehole wall must be supported to prevent collapse. Conventional well drilling methods involve the installation of a casing string and cementing between the casing and the borehole to provide support for the borehole structure.

Within the casing or within the open wellbore, a variety of tubular components are utilized in, for example, preparation and servicing of the well and for the production of wellbore fluids. In some applications, the use of expandable tubulars is becoming more desirable. In such applications, a tubular component is moved downhole and then expanded at a desired location within the wellbore. With these types of tubulars in particular, the connection of one tubular to another becomes difficult. Connectors or connection systems designed for conventional tubulars do not readily adapt to tubular members that are expanded.

The present invention is directed to overcoming, or at least reducing the effects of one or more of the problems set forth above, and can be useful in other applications as well.

SUMMARY OF THE INVENTION

According to one aspect of the present invention, a technique is provided for connecting tubulars, such as those used within a wellbore. The technique is particularly amenable to use with expandable tubulars. The technique allows such expandable tubulars to be connected and yet expanded as desired. Certain connectors utilized with this technique are particularly helpful in connecting tubulars formed of bistable cells that facilitate expansion of the tubular from a contracted stable state to an expanded stable state.

BRIEF DESCRIPTION OF THE DRAWINGS

The invention will hereafter be described with reference to the accompanying drawings, wherein like reference numerals denote like elements, and:

FIGS. 1A and 1B are illustrations of the forces imposed to make a bistable structure;

FIGS. 2A and 2B show force-deflection curves of two bistable structures;

FIGS. 3A–3F illustrate expanded and collapsed states of three bistable cells with various thickness ratios;

FIGS. 5A and 5B illustrate an expandable packer type of deployment device;

FIGS. 6A and 6B illustrate a mechanical packer type of deployment device;

FIGS. 7A–7D illustrate an expandable swage type of deployment device;

FIGS. 9A and 9B illustrate a plug type of deployment device;

FIGS. 10A and 10B illustrate a ball type of deployment device;

FIG. 12 illustrates a motor driven radial roller deployment device;

FIG. 13 illustrates a hydraulically driven radial roller deployment device;

FIGS. 16A–E are partial elevational views of an alternative embodiment of the present invention;

FIGS. 23A–23C illustrate an alternate embodiment of the connection system illustrated in FIGS. 21A–21C;

FIGS. 24A–24C illustrate another alternate embodiment of the connection system illustrated in FIGS. 21A–21C;

FIG. 25 is a side view of a crossover device according to one embodiment of the present invention;

FIG. 26 is a front view of an alternate embodiment of the crossover device illustrated in FIG. 25; and FIGS. 27A–27D illustrate another alternate embodiment of an exemplary connection system.

Figure 4A:
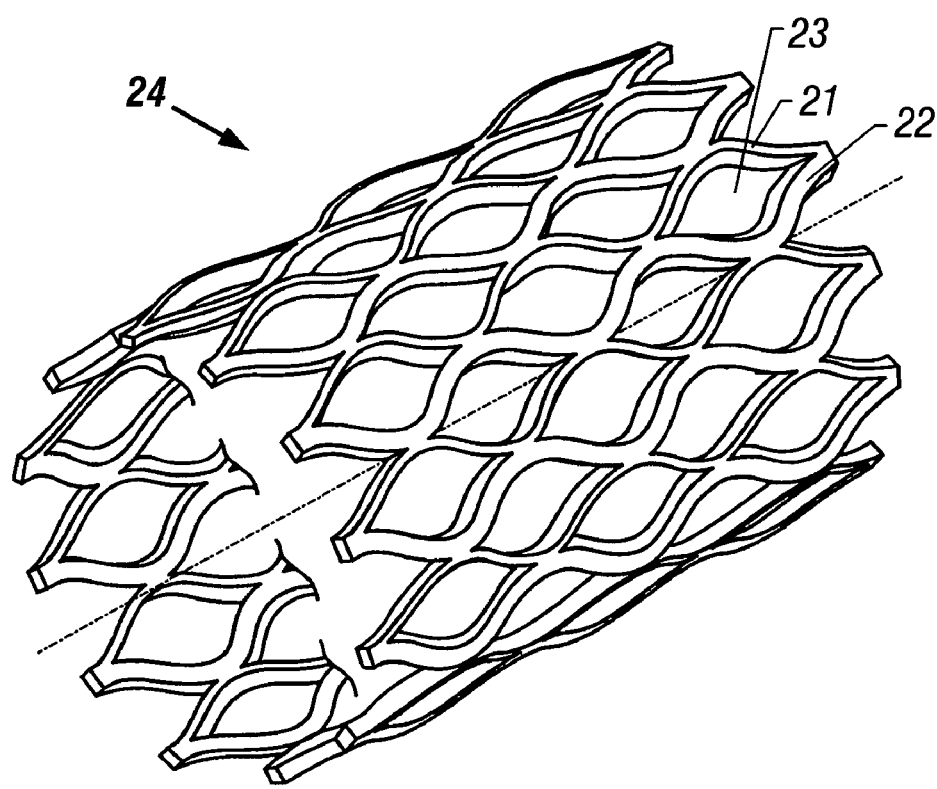
FIGS. 4A and 4B illustrate a bistable expandable tubular in its expanded and collapsed states.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF EXEMPLARY EMBODIMENTS

Bistable devices used in the present invention can take advantage of a principle illustrated in FIGS. 1A and 1B. FIG. 1A shows a rod 10 fixed at each end to rigid supports 12. If the rod 10 is subjected to an axial force it begins to deform as shown in FIG. 1B. As the axial force is increased rod 10 ultimately reaches its Euler buckling limit and deflects to one of the two stable positions shown as 14 and 15. If the buckled rod is now clamped in the buckled position, a force at right angles to the long axis can cause the rod to move to either of the stable positions but to no other position. When the rod is subjected to a lateral force it must move through an angle $\beta$ before deflecting to its new stable position.

Bistable systems are characterized by a force deflection curve such as those shown in FIGS. 2A and 2B. The externally applied force 16 causes the rod 10 of FIG. 1B to move in the direction X and reaches a maximum 18 at the onset of shifting from one stable configuration to the other. Further deflection requires less force because the system now has a negative spring rate and when the force becomes zero the deflection to the second stable position is spontaneous.

The force deflection curve for this example is symmetrical and is illustrated in FIG. 2A. By introducing either a precurvature to the rod or an asymmetric cross section the force deflection curve can be made asymmetric as shown in FIG. 2B. In this system the force 19 required to cause the rod to assume one stable position is greater than the force 20 required to cause the reverse deflection. The force 20 must be greater than zero for the system to have bistable characteristics.

Bistable structures, sometimes referred to as toggle devices, have been used in industry for such devices as flexible discs, over center clamps, hold-down devices and quick release systems for tension cables (such as in sailboat rigging backstays).

Instead of using the rigid supports as shown in FIGS. 1A and 1B, a cell can be constructed where the restraint is provided by curved struts connected at each end as shown in FIGS. 3A–3F. If both struts 21 and 22 have the same thickness as shown in FIGS. 3A and 3B, the force deflection curve is linear and the cell lengthens when compressed from its open position FIG. 3B to its closed position FIG. 3A. If the cell struts have different thicknesses, as shown in FIGS. 3C–3F, the cell has the force deflection characteristics shown in FIG. 2B, and does not change in length when it moves between its two stable positions. An expandable bistable tubular can thus be designed so that as the radial dimension expands, the axial length remains constant. In one example, if the thickness ratio is over approximately 2:1, the heavier strut resists longitudinal changes. By changing the ratio of thick-to-thin strut dimensions, the opening and closing forces can be changed. For example, FIGS. 3C and 3D illustrated a thickness ratio of approximately 3:1, and FIGS. 3E and 3F illustrate a thickness ratio of approximately 6:1.

Figure 4B:
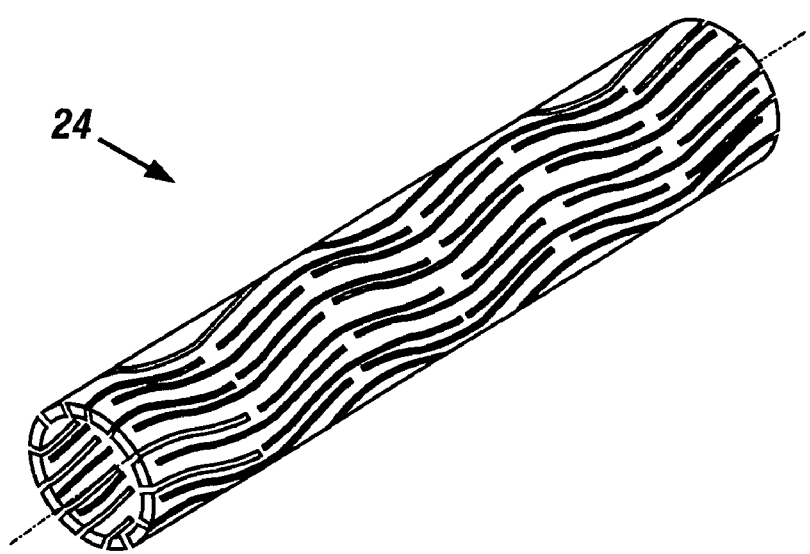

An expandable bore bistable tubular, such as casing, a tube, a patch, or pipe, can be constructed with a series of circumferential bistable connected cells 23 as shown in FIGS. 4A and 4B, where each thin strut 21 is connected to a thick strut 22. The longitudinal flexibility of such a tubular can be modified by changing the length of the cells and by connecting each row of cells with a compliant link. Further, the force deflection characteristics and the longitudinal flexibility can also be altered by the design of the cell shape.

Figures 4C, 4D:
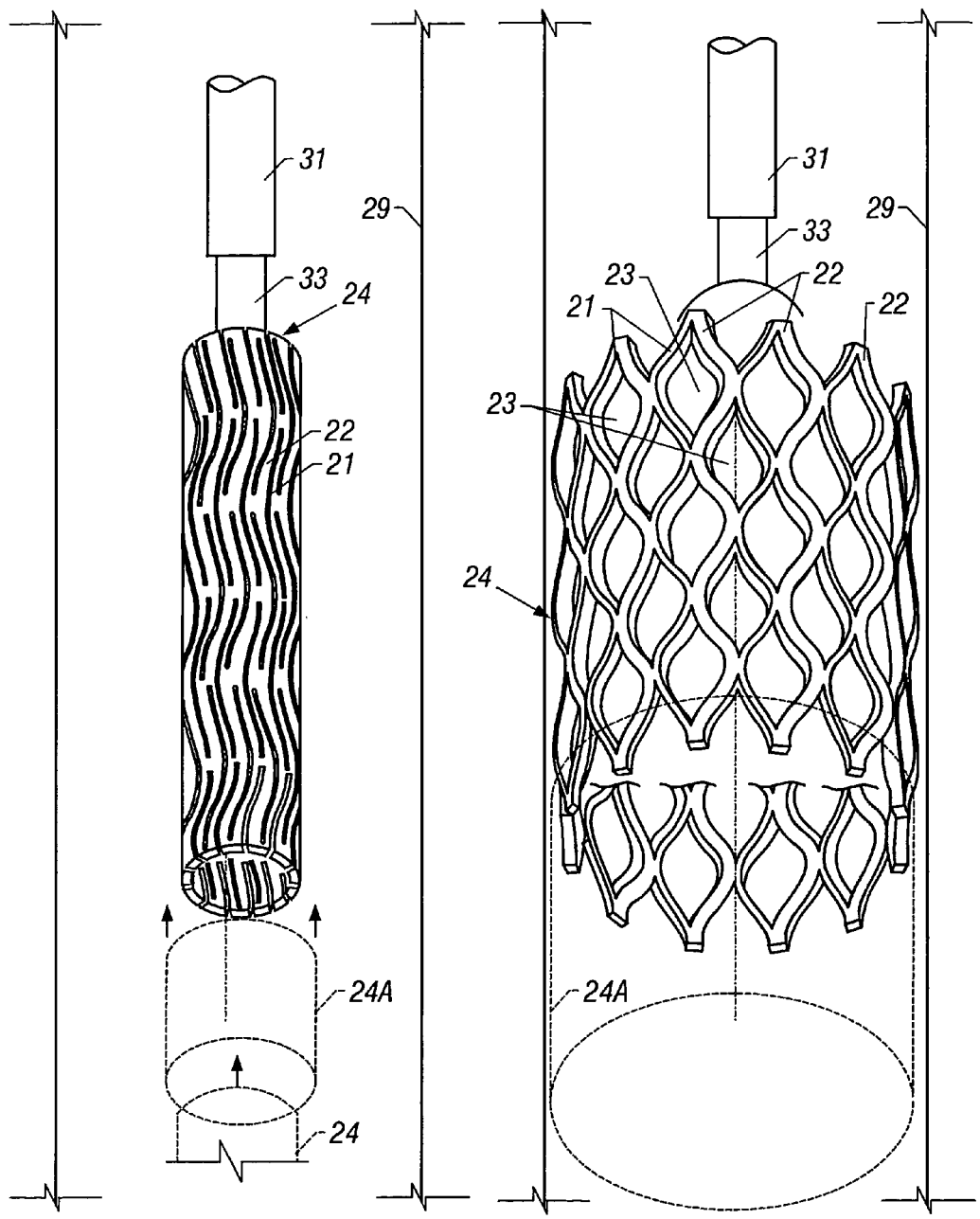
FIGS. 4C and 4D illustrate a bistable expandable tubular in collapsed and expanded states within a wellbore.

FIG. 4A illustrates an expandable bistable tubular 24 in its expanded configuration while FIG. 4B illustrates the expandable bistable tubular 24 in its contracted or collapsed configuration. Within this application the term "collapsed" is used to identify the configuration of the bistable element or device in the stable state with the smallest diameter, it is not meant to imply that the element or device is damaged in any way. In the collapsed state, bistable tubular 24 is readily introduced into a wellbore 29, as illustrated in FIG. 4C. Upon placement of the bistable tubular 24 at a desired wellbore location, it is expanded, as illustrated in FIG. 4D.

The geometry of the bistable cells is such that the tubular cross-section can be expanded in the radial direction to increase the overall diameter of the tubular. As the tubular expands radially, the bistable cells deform elastically until a specific geometry is reached. At this point the bistable cells move, e.g. snap, to a final expanded geometry. With some materials and/or bistable cell designs, enough energy can be released in the elastic deformation of the cell (as each bistable cell snaps past the specific geometry) that the expanding cells are able to initiate the expansion of adjoining bistable cells past the critical bistable cell geometry. Depending on the deflection curves, a portion or even an entire length of bistable expandable tubular can be expanded from a single point.

In like manner if radial compressive forces are exerted on an expanded bistable tubular, it contracts radially and the bistable cells deform elastically until a critical geometry is reached. At this point the bistable cells snap to a final collapsed structure. In this way the expansion of the bistable tubular is reversible and repeatable. Therefore the bistable tubular can be a reusable tool that is selectively changed between the expanded state as shown in FIG. 4A and the collapsed state as shown in FIG. 4B.

In the collapsed state, as in FIG. 4B, the bistable expandable tubular is easily inserted into the wellbore and placed into position. A deployment device is then used to change the configuration from the collapsed state to the expanded state.

In the expanded state, as in FIG. 4A, design control of the elastic material properties of each bistable cell can be such that a constant radial force can be applied by the tubular wall to the constraining wellbore surface. The material properties and the geometric shape of the bistable cells can be designed to give certain desired results.

Figure 11:
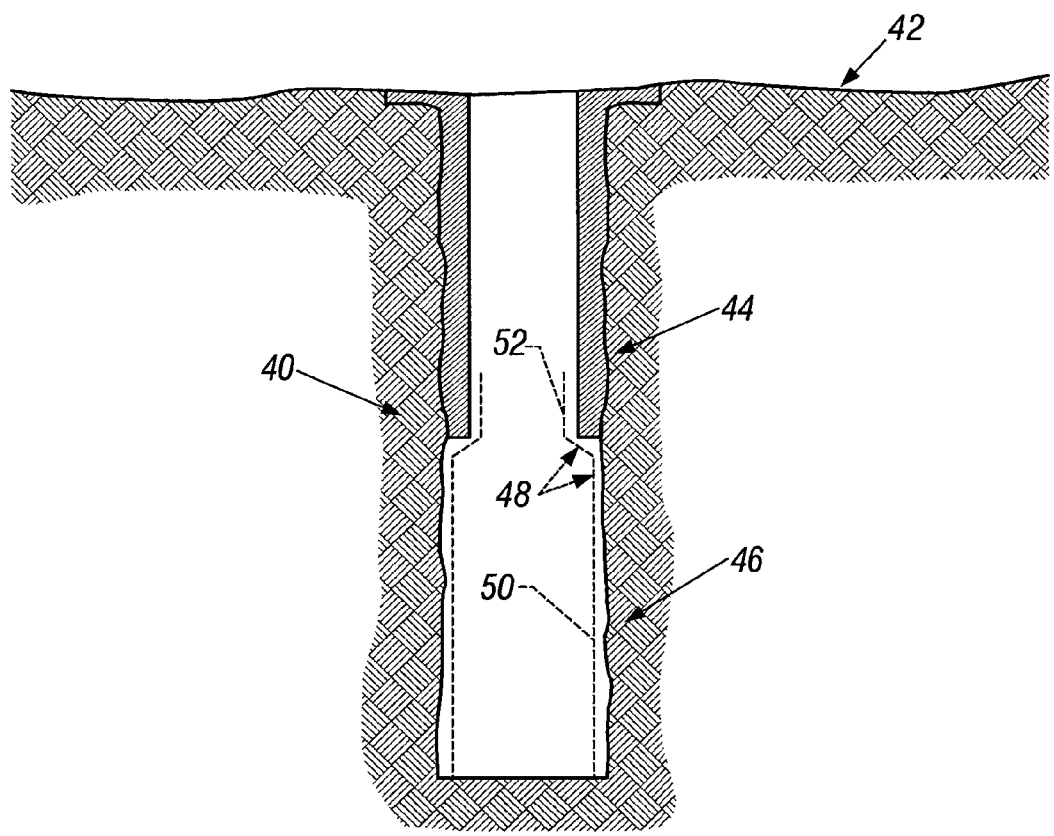
FIG. 11 is a schematic of a wellbore utilizing an expandable bistable tubular.

One example of designing for certain desired results is an expandable bistable tubular string with more than one diameter throughout the length of the string. This can be useful in boreholes with varying diameters, whether designed that way or as a result of unplanned occurrences such as formation washouts or keyseats within the borehole. This also can be beneficial when it is desired to have a portion of the bistable expandable device located inside a cased section of the well while another portion is located in an uncased section of the well. FIG. 11 illustrates one example of this condition. A wellbore 40 is drilled from the surface 42 and comprises a cased section 44 and an openhole section 46. An expandable bistable device 48 having segments 50, 52 with various diameters is placed in the well. The segment with a larger diameter 50 is used to stabilize the openhole section 46 of the well, while the segment having a reduced diameter 52 is located inside the cased section 44 of the well.

Bistable collars or connectors 24A (see FIG. 4C) can be designed to allow sections of the bistable expandable tubular to be joined together into a string of useful lengths using the same principle as illustrated in FIGS. 4A and 4B. This bistable connector 24A also incorporates a bistable cell design that allows it to expand radially using the same mechanism as for the bistable expandable tubular component. Exemplary bistable connectors have a diameter slightly larger than the expandable tubular sections that are being joined. The bistable connector is then placed over the ends of the two sections and mechanically attached to the expandable tubular sections. Mechanical fasteners such as screws, rivets or bands can be used to connect the connector to the tubular sections. The bistable connector typically is designed to have an expansion rate that is compatible with the expandable tubular sections, so that it continues to connect the two sections after the expansion of the two segments and the connector.

Alternatively, the bistable connector can have a diameter smaller than the two expandable tubular sections joined. Then, the connector is inserted inside of the ends of the tubulars and mechanically fastened as discussed above. Another embodiment would involve the machining of the ends of the tubular sections on either their inner or outer surfaces to form an annular recess in which the connector is located. A connector designed to fit into the recess is placed in the recess. The connector would then be mechanically attached to the ends as described above. In this way the connector forms a relatively flush-type connection with the tubular sections.

A conveyance device 31 transports the bistable expandable tubular lengths and bistable connectors into the wellbore and to the correct position. (See FIGS. 4C and 4D). The conveyance device may utilize one or more mechanisms such as wireline cable, coiled tubing, coiled tubing with wireline conductor, drill pipe, tubing or casing.

A deployment device 33 can be incorporated into the overall assembly to expand the bistable expandable tubular and connectors. (See FIGS. 4C and 4D). Deployment devices can be of numerous types such as an inflatable packer element, a mechanical packer element, an expandable swage, a piston apparatus, a mechanical actuator, an electrical solenoid, a plug type apparatus, e.g. a conically shaped device pulled or pushed through the tubing, a ball type apparatus or a rotary type expander as further discussed below.

An inflatable packer element is shown in FIGS. 5A and 5B and is a device with an inflatable bladder, element, or bellows incorporated into the bistable expandable tubular system bottom hole assembly. In the illustration of FIG. 5A, the inflatable packer element 25 is located inside the entire length, or a portion, of the initial collapsed state bistable tubular 24 and any bistable expandable connectors (not shown). Once the bistable expandable tubular system is at the correct deployment depth, the inflatable packer element 25 is expanded radially by pumping fluid into the device as shown in FIG. 5B. The inflation fluid can be pumped from the surface through tubing or drill pipe, a mechanical pump, or via a downhole electrical pump which is powered via wireline cable. As the inflatable packer element 25 expands, it forces the bistable expandable tubular 24 to also expand radially. At a certain expansion diameter, the inflatable packer element causes the bistable cells in the tubular to reach a critical geometry where the bistable "snap" effect is initiated, and the bistable expandable tubular system expands to its final diameter. Finally the inflatable packer element 25 is deflated and removed from the deployed bistable expandable tubular 24.

A mechanical packer element is shown in FIGS. 6A and 6B and is a device with a deformable plastic element 26 that expands radially when compressed in the axial direction. The force to compress the element can be provided through a compression mechanism 27, such as a screw mechanism, cam, or a hydraulic piston. The mechanical packer element deploys the bistable expandable tubulars and connectors in the same way as the inflatable packer element. The deformable plastic element 26 applies an outward radial force to the inner circumference of the bistable expandable tubulars and connectors, allowing them in turn to expand from a contracted position (see FIG. 6A) to a final deployment diameter (see FIG. 6B).

An expandable swage is shown in FIGS. 7A–7D and comprises a series of fingers 28 that are arranged radially around a conical mandrel 30. FIGS. 7A and 7C show side and top views respectively. When the mandrel 30 is pushed or pulled through the fingers 28 they expand radially outwards, as illustrated in FIGS. 7B and 7D. An expandable swage is used in the same manner as a mechanical packer element to deploy a bistable expandable tubular and connector.

Figure 8A:
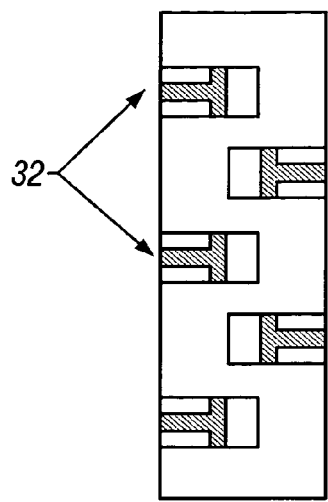
FIGS. 8A–8D illustrate a piston type of deployment device.
Figure 8B:
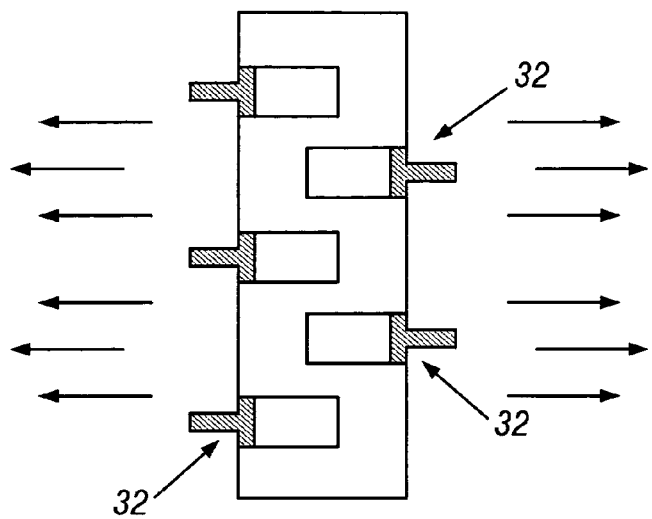
Figure 8C:
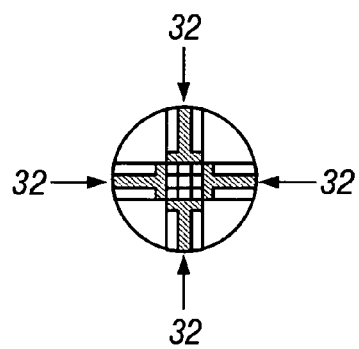
Figure 8D:
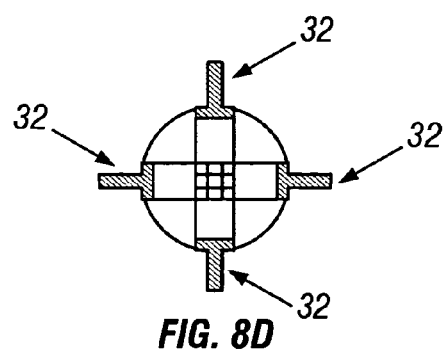

A piston type apparatus is shown in FIGS. 8A–8D and comprises a series of pistons 32 facing radially outwardly and used as a mechanism to expand the bistable expandable tubulars and connectors. When energized, the pistons 32 apply a radially directed force to deploy the bistable expandable tubular assembly as per the inflatable packer element. FIGS. 8A and 8C illustrate the pistons retracted while FIGS. 8B and 8D show the pistons extended. The piston type apparatus can be actuated hydraulically, mechanically or electrically.

A plug type actuator is illustrated in FIGS. 9A and 9B and comprises a plug 34 that is pushed or pulled through the bistable expandable tubulars 24 or connectors as shown in FIG. 9A. The plug is sized to expand the bistable cells past their critical point where they will snap to a final expanded diameter as shown in FIG. 9B.

A ball type actuator is shown in FIGS. 10A and 10B and operates when an oversized ball 36 is pumped through the middle of the bistable expandable tubulars 24 and connectors. To prevent fluid losses through the cell slots, an expandable elastomer based liner 38 is run inside the bistable expandable tubular system. The liner 38 acts as a seal and allows the ball 36 to be hydraulically pumped through the bistable tubular 24 and connectors. The effect of pumping the ball 36 through the bistable expandable tubulars 24 and connectors is to expand the cell geometry beyond the critical bistable point, allowing full expansion to take place as shown in FIG. 10B. Once the bistable expandable tubulars and connectors are expanded, the elastomer sleeve 38 and ball 36 are withdrawn.

Radial roller type actuators also can be used to expand the bistable tubular sections. FIG. 12 illustrates a motor driven expandable radial roller tool. The tool comprises one or more sets of arms 58 that are expanded to a set diameter by means of a mechanism and pivot. On the end of each set of arms is a roller 60. Centralizers 62 can be attached to the tool to locate it correctly inside the wellbore and the bistable tubular 24. A motor 64 provides the force to rotate the whole assembly, thus turning the roller(s) circumferentially inside the wellbore. The axis of the roller(s) is such as to allow the roller(s) to rotate freely when brought into contact with the inner surface of the tubular. Each roller can be conically-shaped in section to increase the contact area of roller surface to the inner wall of the tubular. The rollers are initially retracted and the tool is run inside the collapsed bistable tubular. The tool is then rotated by the motor 64, and rollers 60 are moved outwardly to contact the inner surface of the bistable tubular. Once in contact with the tubular, the rollers are pivoted outwardly a greater distance to apply an outwardly radial force to the bistable tubular. The outward movement of the rollers can be accomplished via centrifugal force or an appropriate actuator mechanism coupled between the motor 64 and the rollers 60.

The final pivot position is adjusted to a point where the bistable tubular can be expanded to the final diameter. The tool is then longitudinally moved through the collapsed bistable tubular, while the motor continues to rotate the pivot arms and rollers. The rollers follow a shallow helical path 66 inside the bistable tubular, expanding the bistable cells in their path. Once the bistable tubular is deployed, the tool rotation is stopped and the roller retracted. The tool is then withdrawn from the bistable tubular by a conveyance device 68 that also can be used to insert the tool.

FIG. 13 illustrates a hydraulically driven radial roller deployment device. The tool comprises one or more rollers 60 that are brought into contact with the inner surface of the bistable tubular by means of a hydraulic piston 70. The outward radial force applied by the rollers can be increased to a point where the bistable tubular expands to its final diameter. Centralizers 62 can be attached to the tool to locate it correctly inside the wellbore and bistable tubular 24. The rollers 60 are initially retracted and the tool is run into the collapsed bistable tubular 24. The rollers 60 are then deployed and push against the inside wall of the bistable tubular 24 to expand a portion of the tubular to its final diameter. The entire tool is then pushed or pulled longitudinally through the bistable tubular 24 expanding the entire length of bistable cells 23. Once the bistable tubular 24 is deployed in its expanded state, the rollers 60 are retracted and the tool is withdrawn from the wellbore by the conveyance device 68 used to insert it. By altering the axis of the rollers 60, the tool can be rotated via a motor as it travels longitudinally through the bistable tubular 24.

Power to operate the deployment device can be drawn from one or a combination of sources such as: electrical power supplied either from the surface or stored in a battery arrangement along with the deployment device, hydraulic power provided by surface or downhole pumps, turbines or a fluid accumulator, and mechanical power supplied through an appropriate linkage actuated by movement applied at the surface or stored downhole such as in a spring mechanism.

The bistable expandable tubular system is designed so the internal diameter of the deployed tubular is expanded to maintain a maximum cross-sectional area along the expandable tubular. This feature enables mono-bore wells to be constructed and facilitates elimination of problems associated with traditional wellbore casing systems where the casing outside diameter must be stepped down many times, restricting access, in long wellbores.

The bistable expandable tubular system can be applied in numerous applications such as an expandable open hole liner where the bistable expandable tubular 24 is used to support an open hole formation by exerting an external radial force on the wellbore surface. As bistable tubular 24 is radially expanded, the tubular moves into contact with the surface forming wellbore 29. These radial forces help stabilize the formations and allow the drilling of wells with fewer conventional casing strings. The open hole liner also can comprise a material, e.g. a wrapping, that reduces the rate of fluid loss from the wellbore into the formations. The wrapping can be made from a variety of materials including expandable metallic and/or elastomeric materials. By reducing fluid loss into the formations, the expense of drilling fluids can be reduced and the risk of losing circulation and/or borehole collapse can be minimized.

Liners also can be used within wellbore tubulars for purposes such as corrosion protection. One example of a corrosive environment is the environment that results when carbon dioxide is used to enhance oil recovery from a producing formation. Carbon dioxide ($CO_2$) readily reacts with any water ($H_2O$) that is present to form carbonic acid ($H_2CO_3$). Other acids can also be generated, especially if sulfur compounds are present. Tubulars used to inject the carbon dioxide as well as those used in producing wells are subject to greatly elevated corrosion rates. The present invention can be used to place protective liners, e.g. a bistable tubular 24, within an existing tubular to minimize the corrosive effects and to extend the useful life of the wellbore tubulars.

Another exemplary application involves use of the bistable tubular 24 as an expandable perforated liner. The open bistable cells in the bistable expandable tubular allow unrestricted flow from the formation while providing a structure to stabilize the borehole.

Still another application of the bistable tubular 24 is as an expandable sand screen where the bistable cells are sized to act as a sand control screen. Also, a filter material can be combined with the bistable tubular as explained below. For example, an expandable screen element can be affixed to the bistable expandable tubular. The expandable screen element can be formed as a wrapping around bistable tubular 24. It has been found that the imposition of hoop stress forces onto the wall of a borehole will in itself help stabilize the formation and reduce or eliminate the influx of sand from the producing zones, even if no additional screen element is used.

The above described bistable expandable tubulars can be made in a variety of manners such as: cutting appropriately shaped paths through the wall of a tubular pipe thereby creating an expandable bistable device in its collapsed state; cutting patterns into a tubular pipe thereby creating an expandable bistable device in its expanded state and then compressing the device into its collapsed state; cutting appropriate paths through a sheet of material, rolling the material into a tubular shape and joining the ends to form an expandable bistable device in its collapsed state; or cutting patterns into a sheet of material, rolling the material into a tubular shape, joining the adjoining ends to form an expandable bistable device in its expanded state and then compressing the device into its collapsed state.

The materials of construction for the bistable expandable tubulars can include those typically used within the oil and gas industry such as carbon steel. They can also be made of specialty alloys (such as a monel, inconel, hastelloy or tungsten-based alloys) if the application requires.

The configurations shown for the bistable tubular 24 are illustrative of the operation of a basic bistable cell. Other configurations may be suitable, but the concept presented is also valid for these other geometries.

Figure 14:
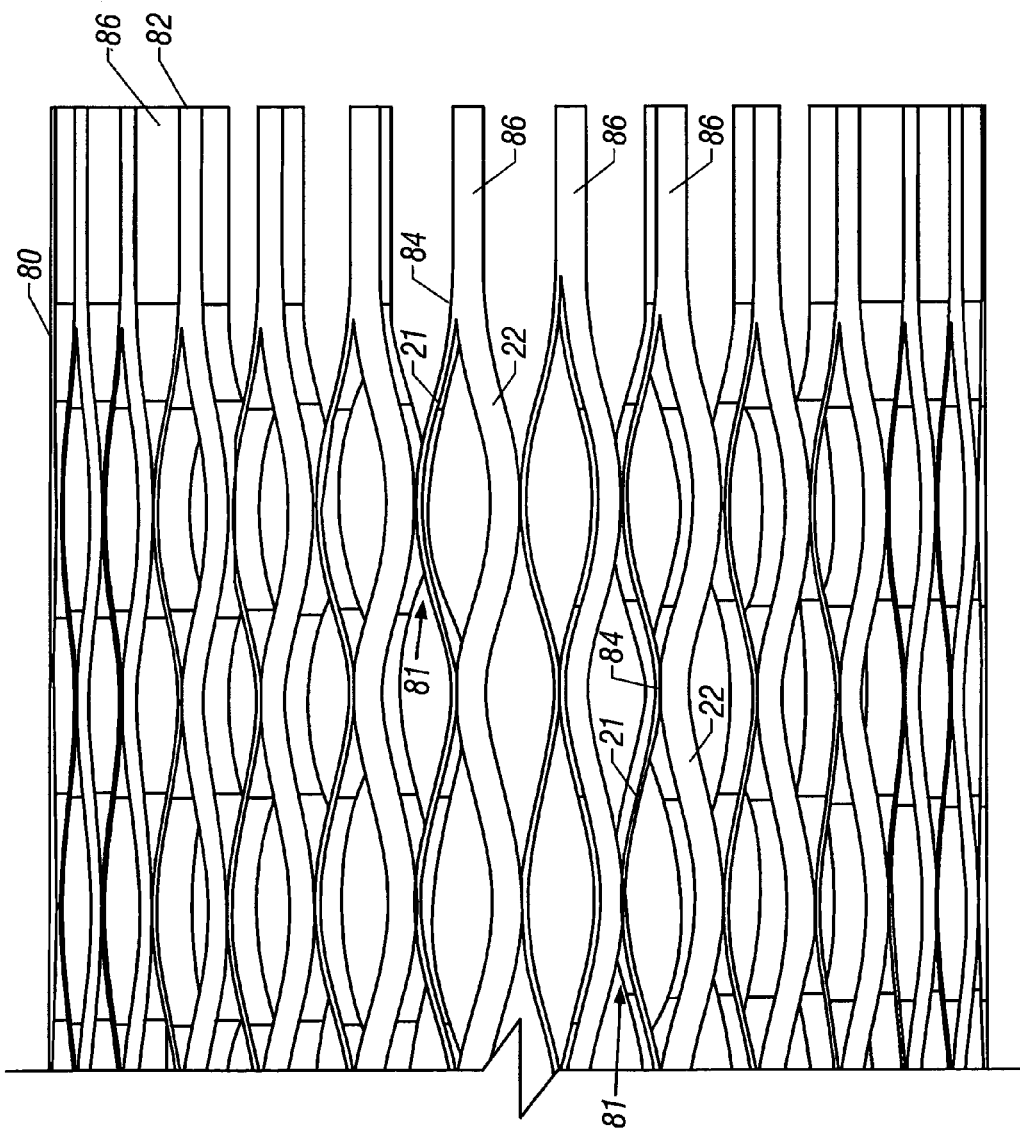
FIG. 14 is a partial side elevational view of an alternative embodiment of the present invention.
Figure 15:
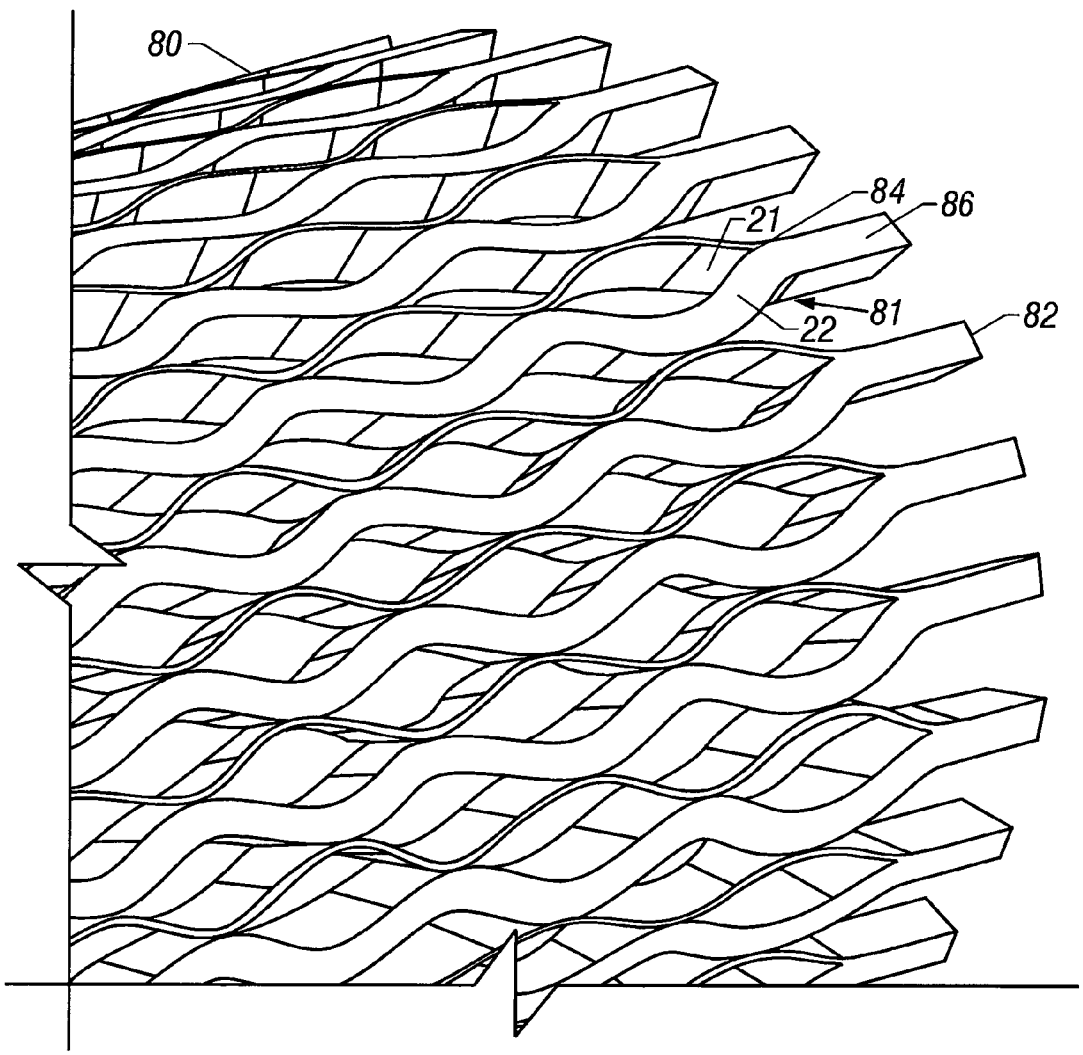
FIG. 15 is a partial side elevational view of an alternative embodiment of the present invention.
Figure 17D:
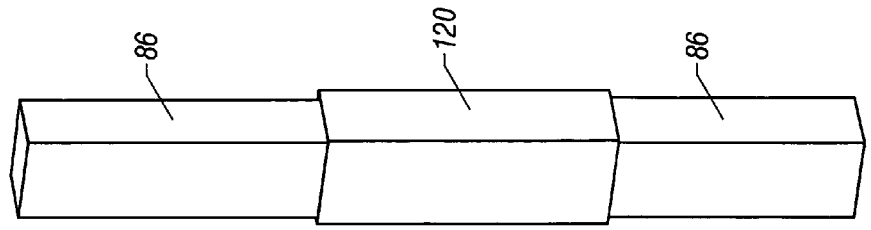
FIGS. 17A–D are partial perspective views of an alternative embodiment of the present invention.
Figure 17C:
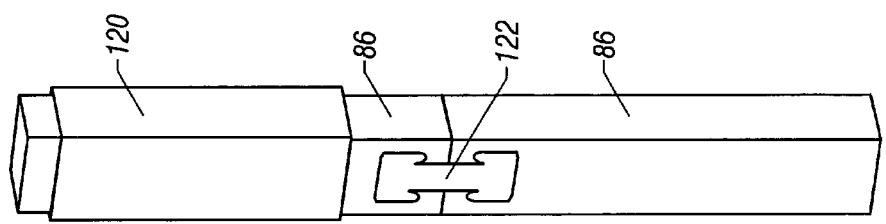
Figure 17B:
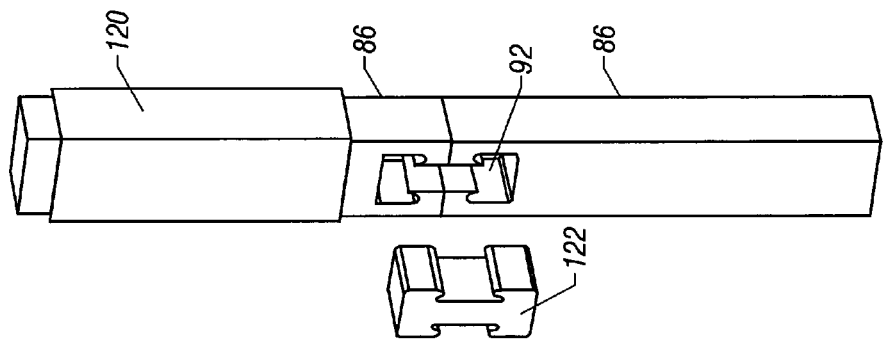
Figure 17A:
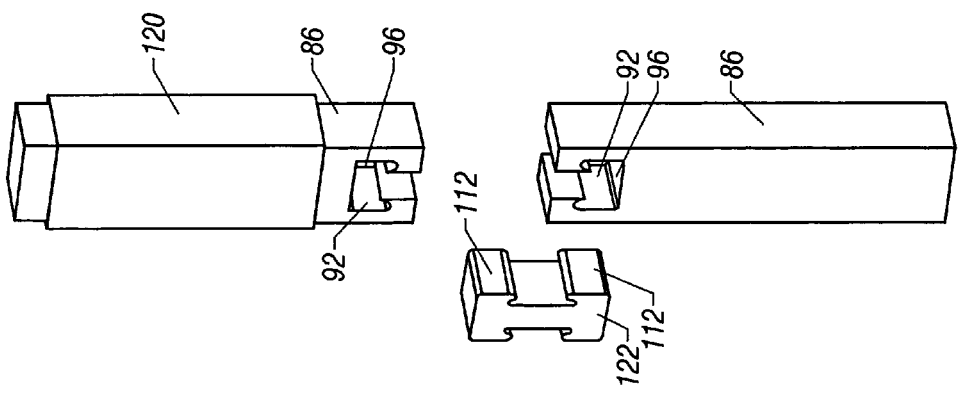

Referring generally to FIGS. 14 and 15, a side elevational view and a perspective view, respectively, are used to illustrated an expandable tubing 80 made of bi-stable cells 81. As previously described, the bi-stable cells 81 are generally formed of a thin strut 21 and a thick strut 22 which intersect at either end 84. In the exemplary embodiment shown in the figures, the end 82 of the tubing 80 comprises a plurality of end extensions 86. The end extensions 86 are connected to an end 84 of the cells 81 nearest the tubing end 82 so that the end extensions 86 extend beyond the cells 81 of the tubing. The tubing may have end extensions on one or both ends thereof.

Further, although the figure illustrates an end extension on all of the endmost cells, alternative embodiments may have end extensions 86 on some portion of such cells only. The end extensions 86 are useful for connecting adjacent expandable tubings as further discussed below as well as for other uses. Note that the end extensions do not undergo deformation as the tubing is expanded. The end extensions may be integrally formed or otherwise attached such as by welding or other attachment methods.

Referring generally to FIGS. 16A–E, a detailed sequence is illustrated of one embodiment of end extensions 86 being connected to adjacent tubings having an associated connector 90. As shown in the figures, one of the end extensions 86 includes an opening 92 formed therein. Although shown as a slot in the FIGS. 16A–E, the opening 92 may take other forms such as a hole drilled in the end, collets, or other types of openings 92. The opening 92 of the disclosed embodiment forms a narrow outer portion 94 and a wide inner portion 96. The opening 92 also may have a slot 98 at the back of the opening 92. The end 100 of the end extension 86 has a slanted, or tapered, interior 102 and a slanted, or tapered, exterior 104. Although shown as slanted, the end 100 may be blunt, rounded or some other shape.

A pin 110 mounted to the end of a corresponding extension 86 has a broad head 112 with a slanted forward face 114. The pin 110 is shaped and sized to mate with the opening 92. The figures show how the pin 110 passes through the outer portion 94 of the opening 92. As the pin 110 passes through the outer portion 94, the opposing sides flex outwardly (FIG. 16B) to accommodate the relatively larger head 112. Once the head is positioned in the inner portion 96 (FIG. 16C), the sides may flex back to their original position or near their original position. The slot 98 may provide added resiliency to facilitate placement of the pin 110 in the opening 92.

Once the head 112 is positioned inside the opening 92, sleeve 120 slides over the mating pin 110 and opening 92 to maintain them in mating connection (see FIGS. 16D and 16E). The slanted exterior 104 of the end extension 86 facilitates movement of the sleeve 120 thereon. Note that the sleeve may be replaced by a clip surrounding the mating pin 110 and opening 92 or other device that can maintain the relative position of the mating pieces.

It should also be noted that in one embodiment, the head 112 provides for some plastic deformation of the sides of the end extension 86 so that the sides remain slightly flared. The flared sides provide for increased friction useful in holding the sleeve in place. Alternatively the end extensions 86 may provide detents or other mechanisms to prevent the sleeve from slipping out of position.

Referring to FIGS. 17A–D, an alternative embodiment for connecting the end extensions 86 of adjacent tubings is illustrated. In this embodiment, both end extensions 86 have openings 92 formed therein. Once the end extensions 86 are positioned adjacent one another, mating connectors 122 are moved into the openings 92 to maintain the relative position of the end extensions 86. As with the prior embodiment, the connector 122 has widened head portions 112 that fit within wide inner portions 96 of the openings 92. A sleeve 120 slides over the mating connector 122 and openings 92 to help maintain their relative positions. Note that the connectors 122 may have detents or other features that eliminate the need for the sleeve 120. Alternatively, the sleeve 120 may be replaced with a clip, adhesive, resin, tape, or other manner of holding the connector 122 in the openings 92. Although the above description relies on the use of end extensions 86 they may be omitted in certain alternative embodiments with the openings formed at the end of the endmost cells.

Figure 18:
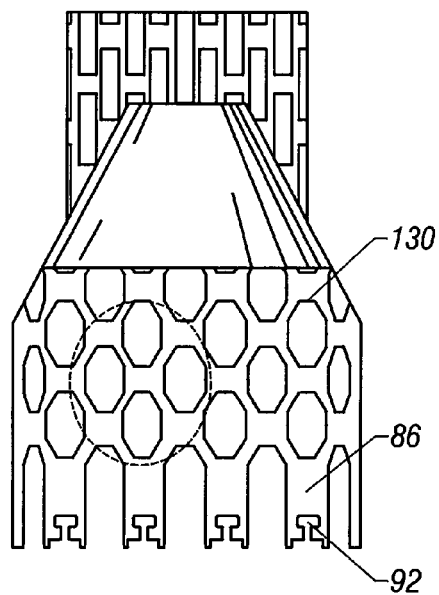
FIG. 18 is a side elevational view of an expandable slotted tubing having end extensions of the present invention.

Also, note that other types of expandable tubings may benefit from the connection type taught herein. For example, as illustrated in FIG. 18, an expandable slotted tube 130 of the type disclosed in U.S. Pat. No. 5,366,012, issued Nov. 22, 1994 to Lohbeck has overlapping longitudinal slots. As can be viewed in FIG. 18, tubing 130 has end extensions 86 with openings 92 formed therein. The end extensions and openings may be used to connect the tubing 130 to an adjacent tubing in a manner similar to that previously described. As with the other embodiments, these types of connectors readily allow expansion of the connected ends of the tubulars along with the rest of the tubular as opposed to the traditional connection systems that are not as amenable to expansion.

Figure 19:
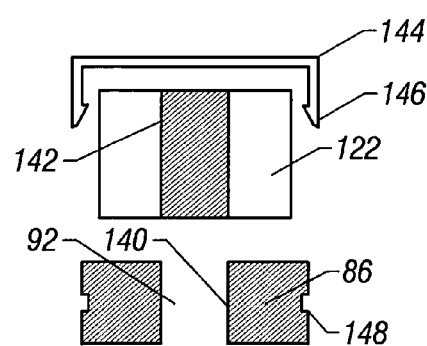
FIG. 19 is a partial cross-sectional end view of an embodiment of the connector of the present invention.

In FIG. 19, another alternative embodiment is illustrated in which the connector 122 has sides 142 that slant inwardly approaching one end. The sides 140 of the mating opening 92 also slant inwardly such that the connector 122 may be placed in the opening in one direction only. The tolerance between the opening 92 and the connector 122 holds the connector in place in one direction. The slanted surfaces 140, 142 may be replaced with equivalents such as shoulders and the like. The embodiment shown also has a clip 144 with resilient side arms and detents 146 that mate with indentations 148 formed in the end extensions 86. The detents 146 and indentations 148 mate to hold the clip 144 on the end extension 86. The clip 144 is placed on the side through which the connector 122 is placed.

Figure 20:
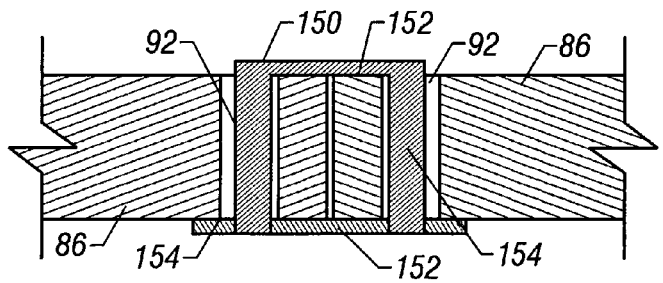
FIG. 20 is a partial cross-sectional side view of an embodiment of the connector of the present invention.

Illustrated in FIG. 20 is another alternative embodiment in which the openings 92 do not open to the ends of the end extensions 86. A connector 150 has side members 152 that are coupled to retention members 154. Retention members 154 are sized to extend through the openings 92 into engagement with side members 152. Side members 152 may be coupled to retention members by a variety of mechanisms including snap fits, permanent fixation or fasteners. The tensile strength of the combined connections should be sufficient to prevent separation of the connected tubings. Accordingly, the connector may be formed of a material that is different from the material of the tubing.

Figures 21A, 21B:
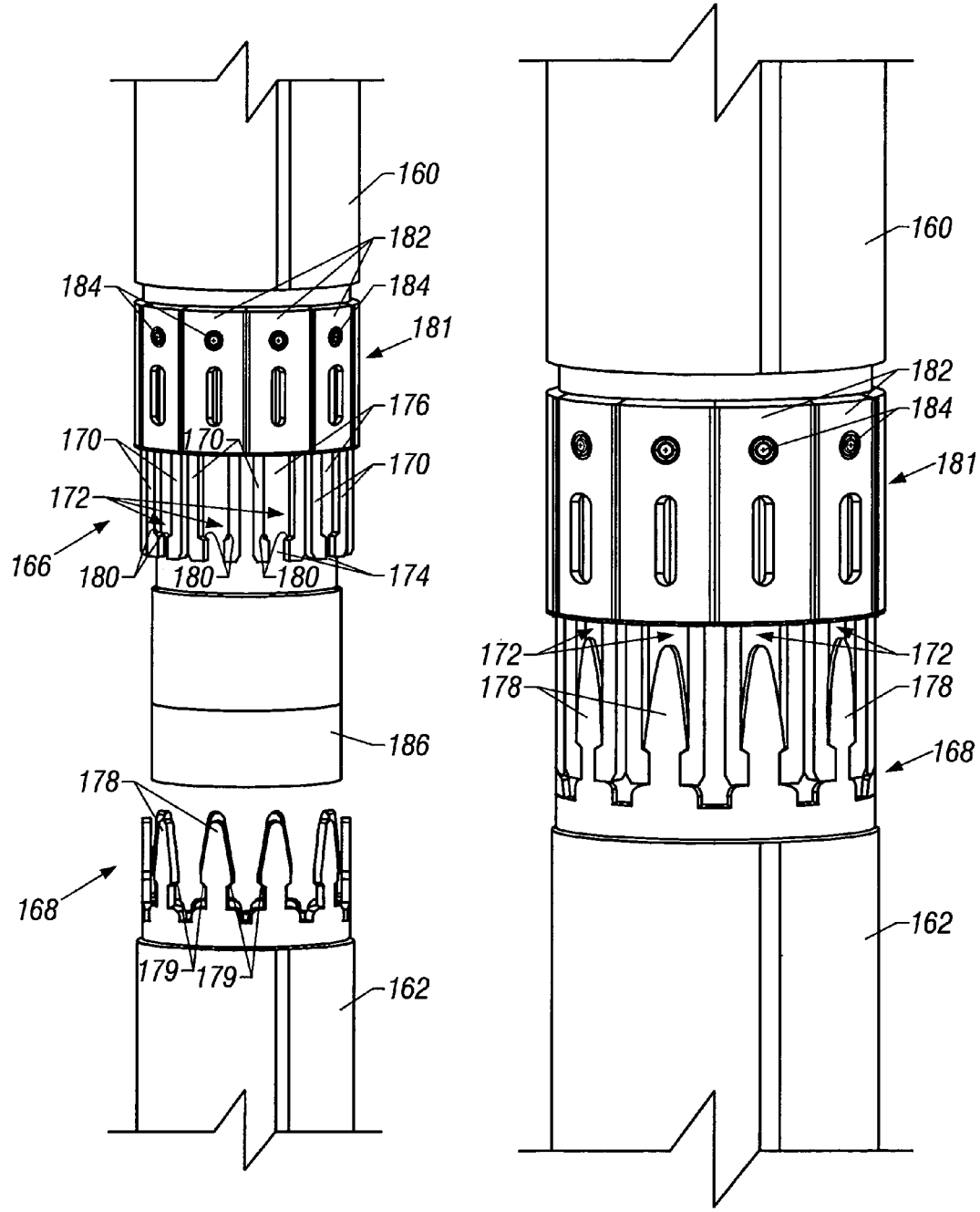
FIGS. 21A–21E illustrate the sequential coupling of adjacent tubulars with a sand barrier.
Figure 21C:
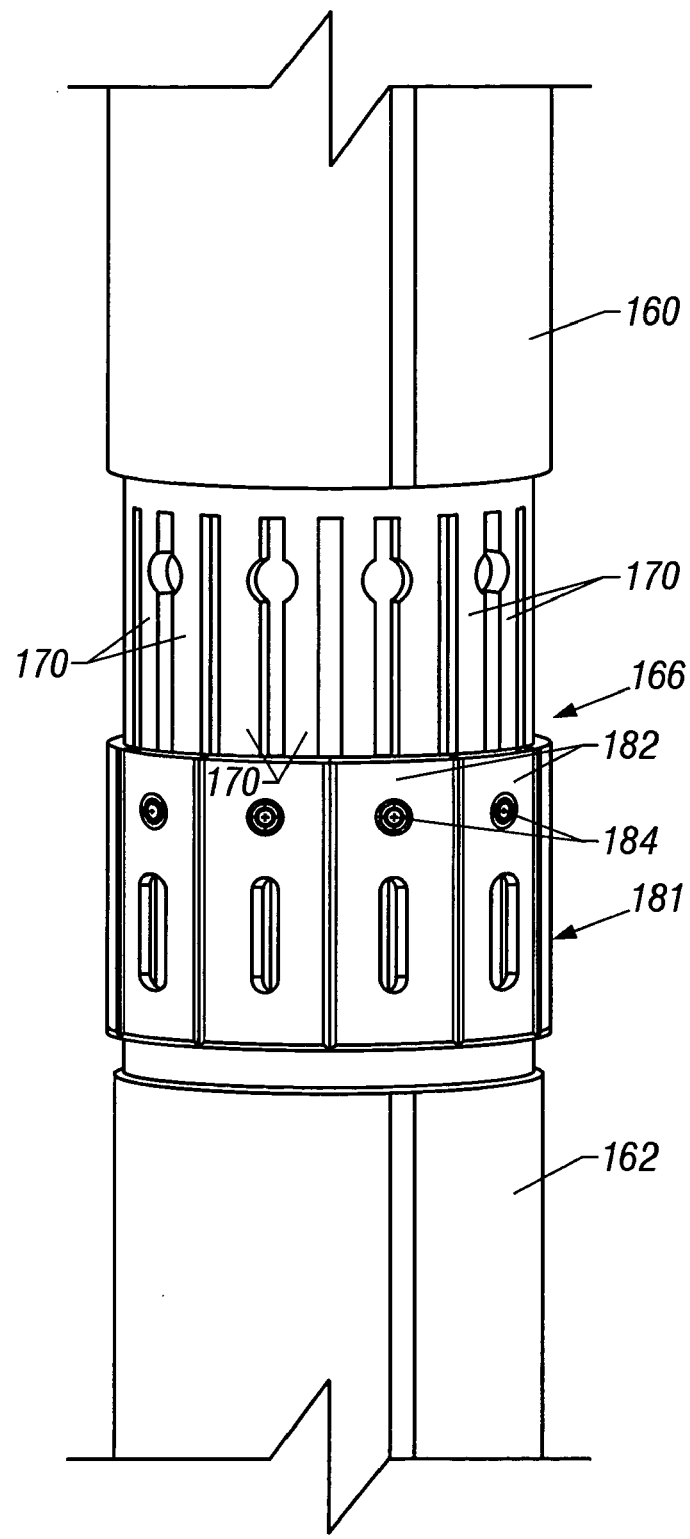

Referring generally to FIGS. 21A–21C, another embodiment of an expandable connection system is illustrated. In this embodiment, a first tubular 160 is coupled to a second tubular 162 by a connection system 164. First tubular 160 and second tubular 162 may be comprised of a plurality of bistable cells, as described above. Additionally, connection system 164 may be designed to function similarly to the embodiments described above.

As illustrated, connection system 164 comprises a receiving end 166 extending from first tubular 160 and an insertion end 168 extending from second tubular 162. The exemplary receiving end 166 comprises a plurality of extensions 170 that define a plurality of openings 172 each having a narrow outer portion 174 and a wider inner portion 176 similar to openings described above. Insertion end 168 comprises a plurality of pins or broad heads 178 that may be tapered towards a leading edge for insertion into openings 172 through the narrow outer portions 174. Each of the pins 178 includes a recessed retention feature 179 designed to engage a corresponding retention feature 180 of each extension 170. Retention features 179 and 180 are designed to prevent inadvertent separation of first tubular 160 and second tubular 162. Additionally, a retention member 181, e.g. an expandable slide cover, is mounted to at least one of first tubular 160 and second tubular 162. In the embodiment illustrated, retention member 181 is slidably mounted to first tubular 160 such that it may be moved over extensions 170 and pins 178 after coupling of first tubular 160 to second tubular 162 to secure the connection. In the example illustrated, retention features 179 and 180 do not extend radially outward beyond the outside diameter of first tubular 160 and second tubular 162. Thus, the outside diameter of the collective extensions of connector system 164 does not exceed the outside diameters of first and second tubulars 160 and 162.

Figure 21D:
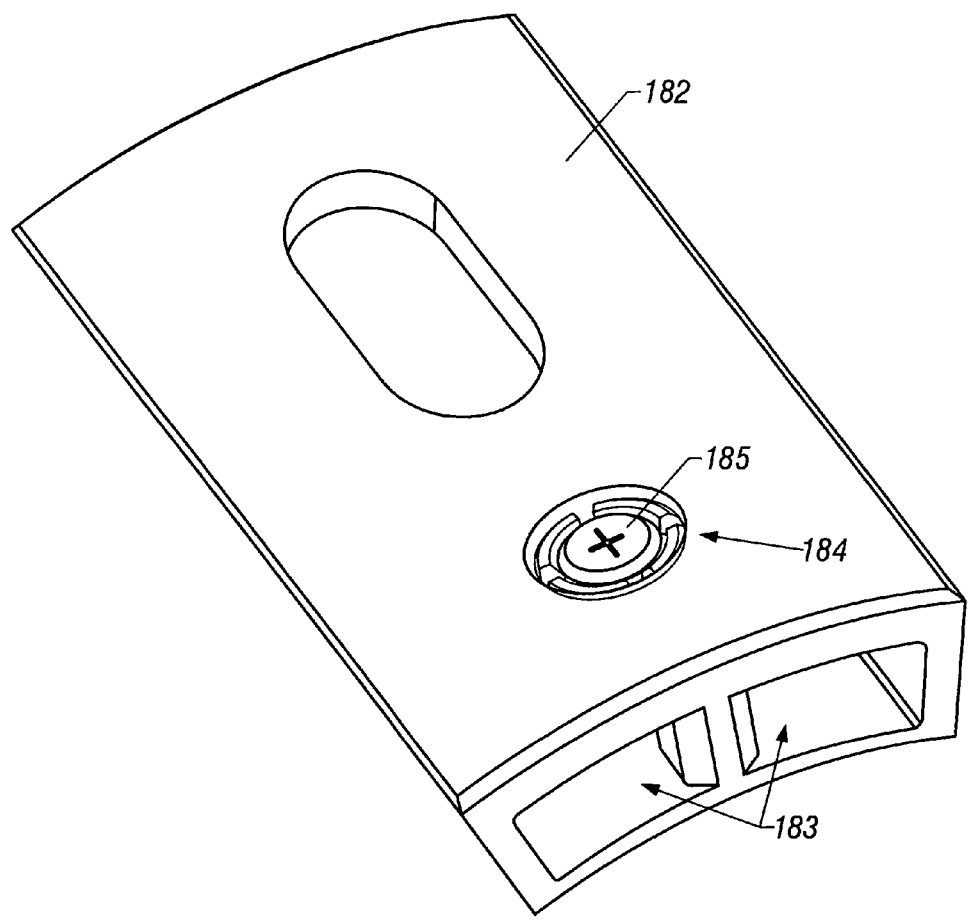
Figure 21E:
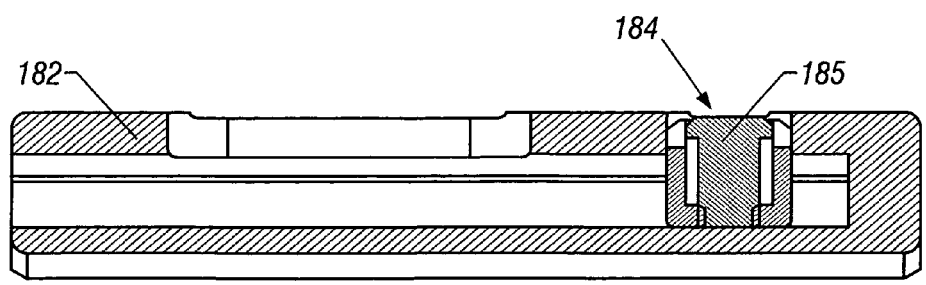

An exemplary retention member 181 is a slide cover comprising a plurality of separable sections 182 that each have a pair of longitudinal openings 183 through which a pair of cooperating extensions 170 are received (see FIGS. 21D and 21E). When the slide cover is in a disengaged position as illustrated in FIG. 21A, cooperating extensions 170 may be sufficiently spread to receive a pin 178 as illustrated in FIG. 21B. Once extensions 170 and pins 178 are interlocked, the slide cover is moved to an engaged position, as illustrated in FIG. 21C. In this engaged position, extensions 170 are prevented from spreading by virtue of their capture within openings 183. Separable sections 182 may be independent of each other or connected by an expandable material or flexible connection that permits radial expansion of retention member 181.

Figure 22:
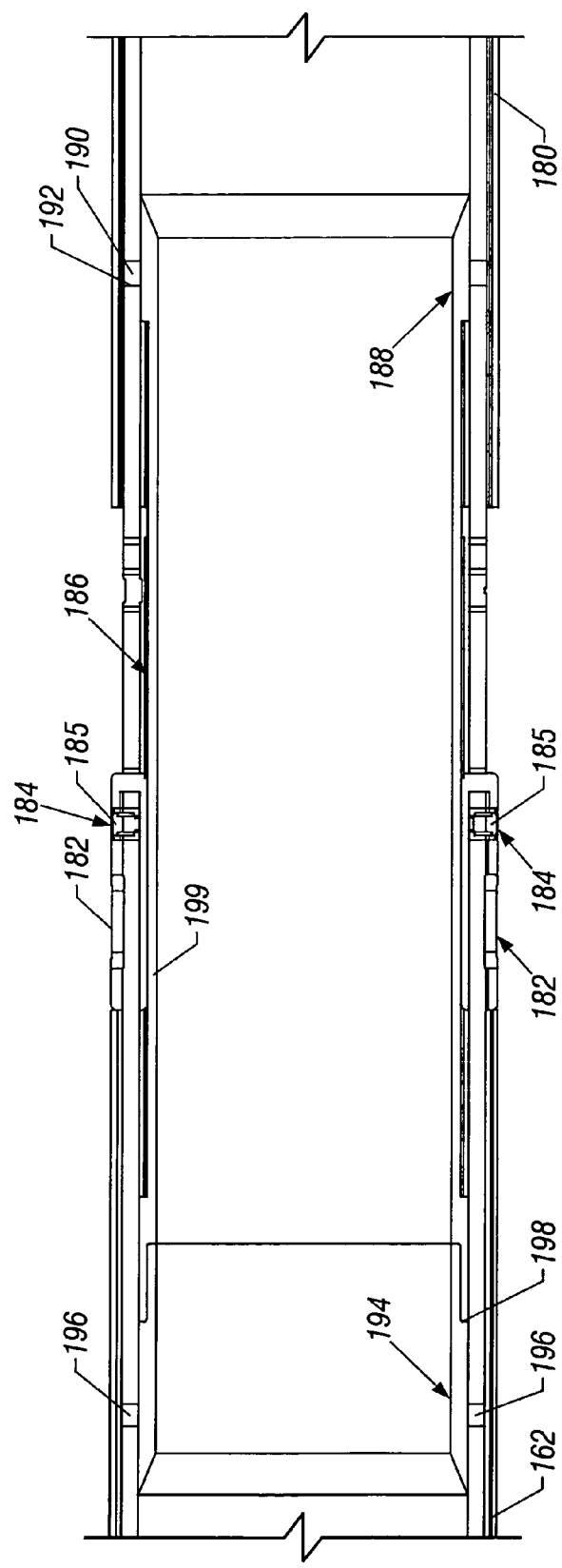
FIG. 22 is a cross-sectional view taken generally along the axis of the connected tubulars illustrated in FIG. 21C.

Additionally, the slide cover may comprise one or more integrated locking devices 184 used to hold the slide cover in its engaged position, although the locking devices also can be used to hold the slide cover in the disengaged position. An exemplary locking device 184 comprises a plurality of threaded studs 185 threadably received through corresponding sections 182. One or more of the threaded studs 185 may be rotated and moved radially inwardly to hold the slide cover or at least the corresponding section 182 at a desired location. For example, when the slide cover is moved to the engaged position, threaded studs 185 are rotated inwardly, as illustrated in FIGS. 21E and 22, to prevent the slide cover from being inadvertently moved to the disengaged position. Specifically, extensions 170 are designed to block movement of the studs 185 towards a disengaged position once threaded radially inwardly a sufficient amount.

Additionally, connection system 164 may comprise a sand barrier 186 designed to limit the influx of sand through connection system 164. In this embodiment, sand barrier 186 is disposed along the interior of connection system 164. For example, at least a portion of sand barrier 186 may be coupled to the interior of first tubular 160 such that it extends beyond extensions 170. (See FIG. 21A). When first tubular 160 and second tubular 162 are moved together, sand barrier 186 moves into the interior of second tubular 162 as pins 178 are inserted into openings 172, as illustrated best in FIG. 21B. Following insertion, slide cover 181 is moved towards second tubular 162 and over the interlocked extensions 170 and 178 to further assist in preventing unwanted separation of the tubular components.

Referring generally to FIG. 22, one exemplary embodiment of this internal type of sand barrier is illustrated. In this embodiment, a sand barrier sand sleeve 188 is connected to the interior of first tubular 160 by, for example, a plurality of pins 190 received in corresponding slots 192 formed in tubular 160. Another exemplary mechanism for fastening sand barrier sleeve 188 to tubular 160 is a plurality of weldments placed on selected portions of the tubular so as to not interfere with expansion. Weldments can be used alone or in addition to other retention features, such as pins 190. A barrier cap 194 is affixed to second tubular 162 by, for example, pins 196 and/or appropriate weldments. Barrier cap 194 comprises a recessed region 198 for receiving and holding sand barrier sleeve 188 when first tubular 160 and second tubular 162 are coupled together. A plurality of barrier sheets 199 may be combined with or incorporated into sand sleeve 188. Exemplary barrier sheets 199 comprise overlapping, metallic sheets that permit expansion of the sand barrier 186 without effecting blockage of sand influx. Other exemplary barriers comprise woven filtration materials, slotted metallic sheets with slots sized according to desired filtration parameters, or elastomeric materials.

Figure 23C:
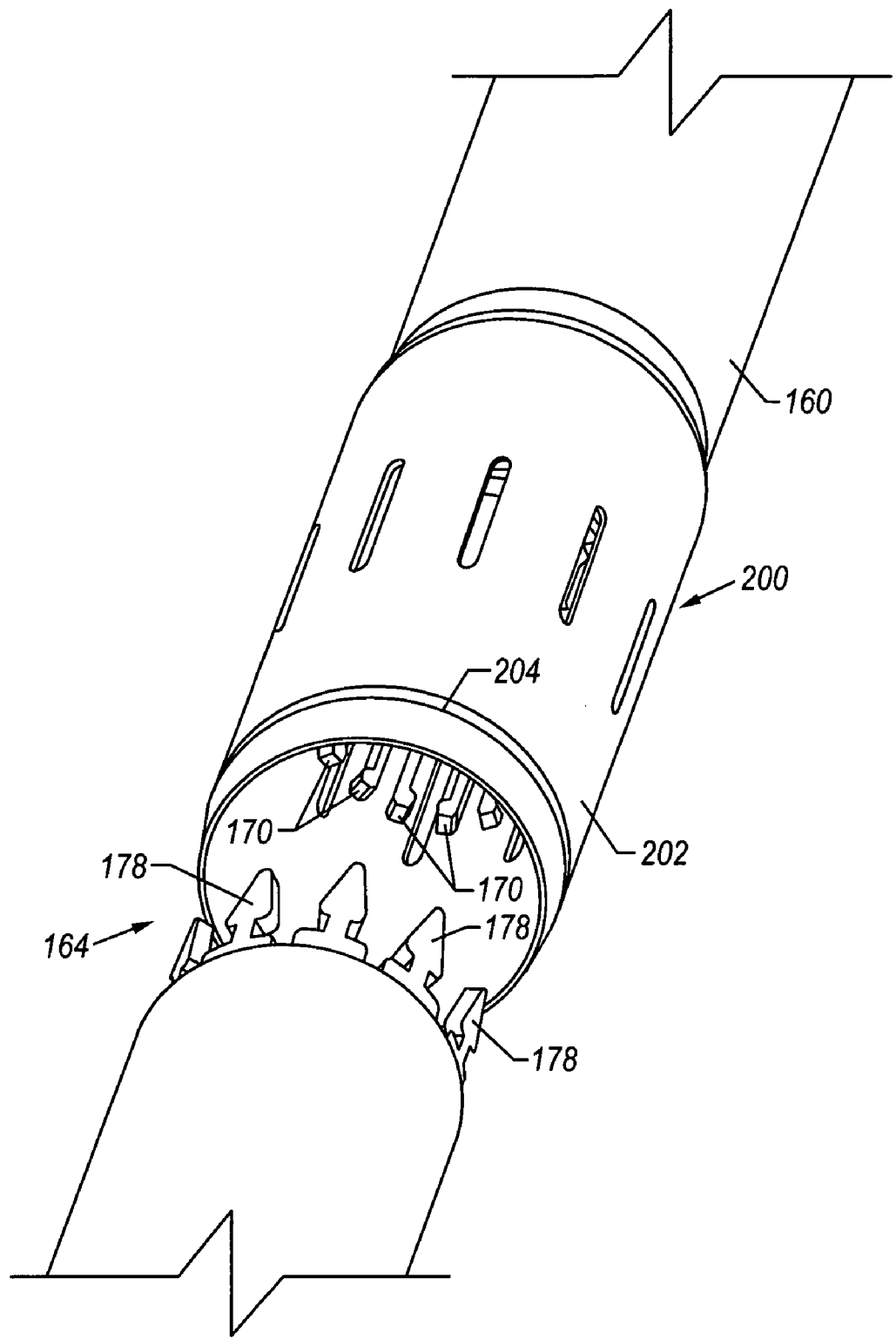

An alternate embodiment of the sand barrier is illustrated in FIGS. 23A–23C and labeled as sand barrier 200. In this embodiment, the illustrated connection system 164 is similar to that shown and described in FIGS. 21A–21C. Sand barrier 200, however, is an external sand barrier similar in design to the interior sand barrier 186, except disposed to slide over the exterior of connection system 164.

For example, sand barrier 200 may be attached along the exterior of first tubular 160 by appropriate fasteners, weldments, etc., as illustrated best in FIGS. 23A and 23C. As insertion end 168 of second tubular 162 is moved into engagement with receiving end 166 of first tubular 160, sand barrier 200 moves over second tubular 162 and covers connection system 164, as best illustrated in FIG. 23B. One exemplary sand barrier 200 comprises an outer shroud 202 covering one or more barrier sheets 204 (see FIG. 23C), however a variety of layers and materials can be combined to create the sand barrier. An exemplary sand barrier is made from a material that is hyperelastic, capable of shape memory, or made from other expandable materials, such as titanium alloys, to achieve the desired expansion effect.

Figure 24C:
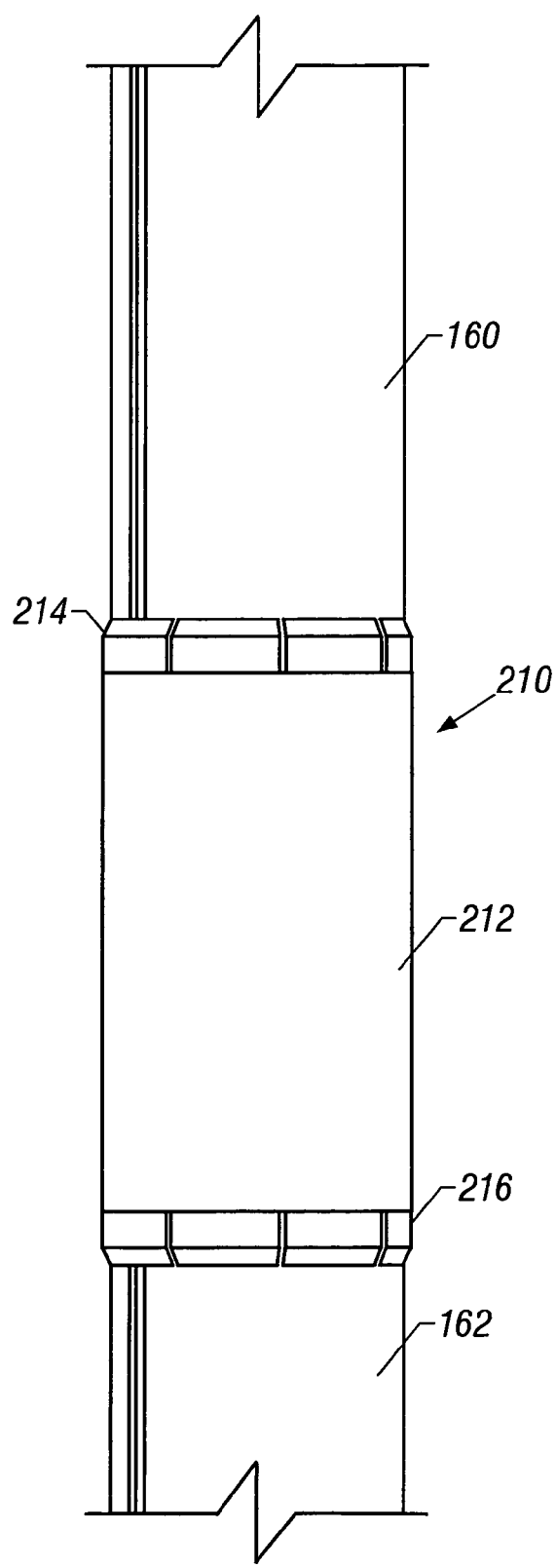

Another exemplary embodiment of a sand barrier is illustrated in FIGS. 24A–24C. In this embodiment, a sand barrier 210 comprises an expandable shroud and filter layer 212 that is pulled over a first run-in guide 214, as illustrated in FIG. 24A. The shroud and filter layer 212 is moved over run-in guide 214 (see FIG. 24B) until it is positioned generally between run-in guide 214 and a secondary run-in guide 216, as illustrated best in FIG. 24C.

Referring generally to FIGS. 25 and 26, additional embodiments of the present invention are illustrated in the form of crossover devices. For example, in FIG. 25, an expandable crossover 220 is illustrated. Expandable crossover 220 comprises an expandable section 222 and a solid section 224. Crossover 220 typically comprises a connector end 226 having, for example, internal threads for threaded engagement with an adjacent component. Also, the expandable section may be formed with one or more bistable cells.

Additionally, expandable crossover 220 comprises a connector 228 generally opposite connector end 226. Connector 228 may be any of a variety of the connectors described above including, for example, a plurality of extension pins designed for receipt in corresponding extensions. Furthermore, any of the variety of sand barriers discussed above can be combined with expandable crossover 220 proximate connector 228.

Expandable section 222 also may comprise or be combined with a variety of other components. For example, sand filtration materials and outer shrouds may be incorporated into the design of expandable section 222. Furthermore, expandable section 222 may be surrounded with an elastomeric material, e.g. rubber jacket, for a variety of applications. These are just a few examples illustrating the adaptability of the crossover device.

In another embodiment illustrated in FIG. 26, the crossover is a rigid crossover 230. Though the rigid crossover 230 is not expanded, it can be combined with an expandablestyle connector 232. With connector 232, expandable sand barriers, such as those discussed above, can be incorporated into the design to limit the influx of sand through connector 232. Opposite connector 232, rigid crossover 230 comprises a connector end 234 that may be tapered and comprise a threaded region 236.

Referring generally to FIGS. 27A–27D, another technique is illustrated for coupling the first tubular 160 with the second tubular 162. The technique may be utilized with expandable and non-expandable tubulars.

In this embodiment, a connector system 240 is used to couple first tubular 160 with second tubular 162. Connector system 240 comprises a first connector portion 242 coupled to first tubular 160 and a second connector portion 244 coupled to second tubular 162. First and second connector portions 242, 244 may be separate components attached to the corresponding tubulars, or they may be integrally formed with the tubulars.

First connector portion 242 comprises a plurality of extensions 246 separated by gaps 248, as illustrated best in FIG. 27A. Similarly, second connector portion 244 comprises a plurality of axial extensions 250 separated by axial gaps 252. Axial gaps 252 are sized to receive extensions 246, and gaps 248 are sized to receive axial extensions 250, as illustrated in FIG. 27B.

Furthermore, extensions 246 comprise a first interlock mechanism 254, and axial extensions 250 comprise a second interlock mechanism 256 designed to engage first interlock mechanism 254. Connector system 240 becomes interlocked when extensions 246, 250 are moved axially into their cooperating gaps 252, 248, respectively, and tubulars 160 and 162 are rotated with respect to each other, as illustrated best in FIG. 27C. In the specific embodiment illustrated, first interlock mechanism 254 comprises a plurality of circumferentially oriented ridges 258 separated by spaces 260. The circumferentially oriented ridges 258 extend radially inwardly.

Similarly, an exemplary second interlock mechanism 256 comprises a plurality of outwardly extending ridges 262 separated by spaces 264. Outwardly extending ridges 262 are circumferentially oriented for receipt in spaces 260 when first tubular 160 and second tubular 162 are rotated to interlock connector system 240. Similarly, ridges 258 are sized and oriented for receipt in spaces 264 when connector system 240 is interlocked.

To secure the interlocking of extensions 246 with axial extensions 250, one or more sleeves, such as sliding covers 266, may be mounted over selected extensions, as illustrated in FIGS. 27C and 27D. For example, sliding cover or covers 266 may be slidably disposed on one of the axial extensions 250. The sliding cover is positioned at a location that does not interfere with the insertion of extensions 246 into axial gaps 252 or the rotation of first interlock mechanism 254 into engagement with second interlock mechanism 256, as illustrated best in FIG. 27C.

Once interlocked, each of the one or more sliding covers 266 is slid over the mating first interlock mechanism 254 and second interlock mechanism 256, as illustrated best in FIG. 27D. The sliding cover 266 is sized to prevent the interlocked ridges 258 and 262 from separating and/or rotating with respect to each other. If desired, each sliding cover 266 may be held at a desired location over first interlock mechanism 254 and second interlock mechanism 256 by, for example, a friction fit, detents, set screws, a weldment or other fastening mechanisms.

In some applications, first tubular 160 and/or second tubular 162 are expanded within the wellbore. The unique design of interlocked extensions with gaps therebetween allows connector system 240 to be expanded along with tubulars 160 and 162.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system of expandable tubulars, comprising:
a first bistable expandable tubular;
a second bistable expandable tubular; and
a connector system coupling the first bistable expandable tubular to the second bistable expandable tubular, the connector system having a plurality of interlocking extensions comprising receiving extensions and insertion extensions, each receiving extension having a connector opening with a narrow outer portion and a wider inner portion to interlockingly receive a corresponding insertion extension.

2. The system as recited in claim 1, further comprising a slide cover positioned to secure the plurality of interlocking extensions.

3. The system as recited in claim 1, wherein each insertion extension comprises a broad head for receipt in the wider inner portion.

4. The system as recited in claim 3, wherein the receiving extensions extend from an end of the first bistable expandable tubular and the insertion extensions extend from an adjacent end of the second bistable expandable tubular.

5. The system as recited in claim 1, wherein the connector system comprises a sand barrier.

6. The system as recited in claim 5, wherein the sand barrier is positioned along the interior of the first bistable expandable tubular and the second bistable expandable tubular.

7. The system as recited in claim 5, wherein the sand barrier is positioned along the exterior of the first bistable expandable tubular and the second bistable expandable tubular.

8. The device as recited in claim 1, wherein each extension of the plurality of extensions comprises an opening shaped for insertion of an extension from an adjacent expandable tubular.

9. The device as recited in claim 1, wherein each extension of the plurality of extensions comprises an insertion head for insertion into an extension from an adjacent expandable tubular.

10. A device for use in a wellbore, comprising:
an expandable tubular having a plurality of bistable cells and an expandable connector end formed with a plurality of extensions, wherein the expandable tubular comprises a threaded connector end generally opposite the expandable connector end.

11. The device as recited in claim 10, wherein the expandable tubular is expandable along a portion, the portion being less than its entire length.

12. A method of expanding tubulars, comprising:
forming a first tubular from a plurality of bistable cells;
coupling the first tubular by a plurality of interlocking extensions; and radially expanding the plurality of interlocking extensions during expansion of the first tubular and the second tubular.

13. The method as recited in claim 12, further comprising forming the interlocking extensions with spaced, circumferentially oriented ridges.

14. The method as recited in claim 12, further comprising forming the plurality of interlocking extensions from extensions having receiving openings and extensions having heads sized for receipt in the receiving openings.

15. The method as recited in claim 12, further comprising securing the first tubular to the second tubular with a retention sleeve.

16. The method as recited in claim 12, further comprising placing an internal sand barrier along the plurality of interlocking extensions.

17. The method as recited in claim 12, further comprising placing an external sand barrier along the plurality of interlocking extensions.

18. A method of expanding tubulars, comprising:
forming a first tubular and a second tubular from a plurality of bistable cells;
coupling the first tubular to the second tubular by a plurality of interlocking extensions; and
radially expanding the plurality of interlocking extensions during expansion of the first tubular and the second tubular, wherein the coupling comprises axially moving the plurality of interlocking extensions into engagement and rotating the second tubular with respect to the first tubular.

19. A system for expanding tubulars, comprising:
means for coupling a first bistable tubular to a second bistable tubular with a plurality of interlocking extensions that automatically interlock upon linear movement of the first bistable tubular into engagement with the second bistable tubular; and
means for radially expanding the plurality of interlocking extensions during expansion of the first bistable tubular and the second bistable tubular.

20. The system as recited in claim 19, wherein the means for radially expanding comprises an expansion device moved through a longitudinal opening of the first tubular and the second tubular.

* * * * *